United States Patent
Araki et al.

(10) Patent No.: US 11,905,395 B2
(45) Date of Patent: *Feb. 20, 2024

(54) MOLDED BALE OF RUBBER COMPOSITION, METHOD FOR PRODUCING MOLDED BALE, CROSSLINKING RUBBER COMPOSITION, AND TREAD FOR TIRE

(71) Applicant: Asahi Kasei Kabushiki Kaisha, Tokyo (JP)

(72) Inventors: Yoshifumi Araki, Tokyo (JP); Atsushi Yasumoto, Tokyo (JP); Akitomo Kikuchi, Tokyo (JP); Tomohiro Kondo, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 198 days.

This patent is subject to a terminal disclaimer.

(21) Appl. No.: 17/356,862

(22) Filed: Jun. 24, 2021

(65) Prior Publication Data

US 2021/0403685 A1    Dec. 30, 2021

(30) Foreign Application Priority Data

Jun. 26, 2020 (JP) ................................ 2020-110779
May 12, 2021 (JP) ................................ 2021-080754

(51) Int. Cl.
*C08L 15/00* (2006.01)
*B60C 1/00* (2006.01)
*B60C 11/00* (2006.01)

(52) U.S. Cl.
CPC ............ *C08L 15/00* (2013.01); *B60C 1/0016* (2013.01); *B60C 11/0008* (2013.01); *B60C 2011/0025* (2013.01); *C08L 2312/08* (2013.01)

(58) Field of Classification Search
CPC .... C08L 15/00; C08L 2312/08; B60C 1/0016; B60C 11/0008; B60C 2011/0025
See application file for complete search history.

(56) References Cited

U.S. PATENT DOCUMENTS

| | | |
|---|---|---|
| 5,814,710 A | 9/1998 | Rekonen et al. |
| 2009/0013597 A1 | 1/2009 | Orton |
| 2009/0131597 A1 | 5/2009 | Ko et al. |
| 2014/0005327 A1 | 1/2014 | Horikawa et al. |
| 2014/0121329 A1 | 5/2014 | Araki et al. |
| 2014/0357798 A1 | 12/2014 | Shimizu et al. |
| 2017/0204214 A1 | 7/2017 | Sunaga et al. |
| 2019/0010271 A1 | 1/2019 | Kodemura et al. |
| 2020/0239675 A1 | 7/2020 | Tardif et al. |
| 2021/0403686 A1* | 12/2021 | Araki .................. B60C 1/0041 |

FOREIGN PATENT DOCUMENTS

| | | |
|---|---|---|
| CN | 103443151 A | 12/2013 |
| CN | 103459431 A | 12/2013 |
| CN | 103797067 A | 5/2014 |
| CN | 106795231 A | 5/2017 |
| CN | 108431118 A | 8/2018 |
| JP | 2009-191262 A | 8/2009 |
| JP | 2013-082840 A | 5/2013 |
| JP | 2017-203060 A | 11/2017 |
| JP | 2018-168245 A | 11/2018 |
| WO | 2013/098056 A1 | 7/2013 |
| WO | 2019/078083 A1 | 4/2019 |
| WO | 2019/151126 A1 | 8/2019 |
| WO | 2019/151127 A1 | 8/2019 |

* cited by examiner

*Primary Examiner* — Angela C Scott

(74) *Attorney, Agent, or Firm* — Morgan, Lewis & Bockius LLP

(57) ABSTRACT

An object of the present invention is to obtain a molded bale of a rubber composition that is difficult to cold flow and difficult to be thermally deteriorated. The present invention provides a molded bale of a rubber composition containing: a rubber-like polymer (A) having an iodine value of 10 to 250, 3% by mass or more of an ethylene structure, and less than 10% by mass of a vinyl aromatic monomer block; and aluminum (B), in which a content of the aluminum (B) is 2 ppm or more and 200 ppm or less.

12 Claims, No Drawings

MOLDED BALE OF RUBBER
COMPOSITION, METHOD FOR
PRODUCING MOLDED BALE,
CROSSLINKING RUBBER COMPOSITION,
AND TREAD FOR TIRE

BACKGROUND OF THE INVENTION

Field of the Invention

The present invention relates to a molded bale of a rubber composition, a method for producing a molded bale, a crosslinking rubber composition, and a tread for a tire.

Description of the Related Art

In recent years, in the fields of rubber materials for tire treads, sheets, films and asphalt modification, a rubber composition containing a rubber-like polymer having an ethylene structure and containing a crosslinkable unsaturated group introduced therein has been proposed for purposes of increasing mechanical strength and permanent compression set (see, for example, International Publication Nos. WO2019/151126, WO2019/151127, and WO2019/078083).

The above-described conventionally proposed rubber composition containing a rubber-like polymer having an ethylene structure and containing a crosslinkable unsaturated group introduced therein has, however, problems that cold flow of a molded article of the rubber composition easily occurs to change the shape thereof, the rubber composition is thermally deteriorated during production, a used mold is easily contaminated, the rubber composition is easily peeled off from a molded bale, and a packaging sheet is difficult to adhere to the molded bale.

Therefore, an object of the present invention is to provide a molded bale of a rubber composition that is difficult to cold flow and difficult to be thermally deteriorated.

SUMMARY OF THE INVENTION

The present inventors made earnest studies to solve the above-described problems of the conventional techniques, resulting in finding the following: When an aluminum content in a molded bale of a rubber composition containing a rubber-like polymer having a specific structure is specified to fall in a prescribed range, the molded bale is difficult to cold flow and difficult to be thermally deteriorated during production, and thus, the present invention was accomplished.

Specifically, the present invention provides the following:
[1] A molded bale of a rubber composition, comprising:
a rubber-like polymer (A) having an iodine value of 10 to 250, 3% by mass or more of an ethylene structure, and less than 10% by mass of a vinyl aromatic monomer block; and
aluminum (B),
wherein a content of the aluminum (B) is 2 ppm or more and 200 ppm or less.
[2] The molded bale according to [1],
wherein the rubber-like polymer (A) is at least one selected from the group consisting of a hydrogenated product of a conjugated diene-based polymer, and a hydrogenated product of a copolymer of ethylene and a conjugated diene monomer.
[3] The molded bale according to [1] or [2],
wherein the rubber composition further comprises a metal (C) of group 3 and/or 4 of the periodic table in an amount of 120 ppm or less.
[4] The molded bale according to any one of [1] to [3],
wherein the rubber-like polymer (A) contains 5% by mass or more of a vinyl aromatic monomer unit.
[5] The molded bale according to any one of [1] to [4],
wherein the rubber-like polymer (A) contains a nitrogen atom.
[6] The molded bale according to any one of [1] to [5],
wherein the rubber-like polymer (A) has a modification ratio measured by column adsorption GPC of 40% by mass or more.
[7] The molded bale according to any one of [1] to [6],
wherein the rubber composition further comprises 30% by mass or less of a rubber softener (D).
[8] The molded bale according to any one of [1] to [7],
wherein the rubber composition has a water content of 0.05% by mass or more and 1.5% by mass or less.
[9] The molded bale according to any one of [1] to [8],
wherein the rubber composition comprises 2 ppm or more and 60 ppm or less of lithium.
[10] The molded bale according to any one of [1] to [9],
wherein 90% by mass or more of the content of the aluminum (B) is aluminum oxide and/or aluminum hydroxide.
[11] A method for producing the molded bale according to any one of [1] to [10], comprising:
a step of polymerizing the rubber-like polymer (A) in a solution;
a step of adding the aluminum (B) to the solution containing the rubber-like polymer (A) to obtain a rubber composition; and
a step of molding the rubber composition.
[12] A method for producing the molded bale according to any one of [1] to [10], comprising:
a step of obtaining the rubber-like polymer (A) by a hydrogenation reaction using a hydrogenation catalyst prepared with trimethylaluminum and/or triethylaluminum; and
a step of molding the rubber-like polymer (A).
[13] The method for producing the molded bale according to [11] or [12], comprising a step of removing a solvent by steam stripping from the solution containing the rubber-like polymer (A).
[14] A crosslinking rubber composition, comprising:
the rubber composition of the molded bale according to any one of [1] to [10]; and
a crosslinking agent,
wherein the crosslinking agent is contained in an amount of 0.1 parts by mass or more and 20 parts by mass or less with respect to 100 parts by mass of a rubber component.
[15] A tread for a tire, containing the rubber composition of the molded bale according to any one of [1] to [10].

According to the present invention, a molded bale of a rubber composition that is difficult to cold flow and difficult to be thermally deteriorated can be obtained.

DETAILED DESCRIPTION OF THE PREFERRED EMBODIMENT

Now, an embodiment for practicing the present invention (hereinafter referred to as the "present embodiment") will be described in detail.

It is noted that the following embodiment is merely illustrative for describing the present invention, and that the present invention is not limited to the following embodiment. The present invention can be practiced with modifications appropriately made within the scope thereof.

[Molded Bale of Rubber Composition]

A molded bale of a rubber composition of the present embodiment is a molded bale of a rubber composition, containing a rubber-like polymer (A) having an iodine value of 10 to 250, 3% by mass or more of an ethylene structure, and less than 10% by mass of a vinyl aromatic monomer block; and aluminum (B), in which a content of the aluminum (B) is 2 ppm or more and 200 ppm or less.

Owing to this configuration, a molded bale of a rubber composition difficult to cold flow and difficult to be thermally deteriorated during production, storage, and processing can be obtained.

(Rubber-Like Polymer (A))

The rubber-like polymer (A) contained in the rubber composition contained in the molded bale of the present embodiment (hereinafter referred to as the rubber composition of the present embodiment) is a rubber-like polymer having an iodine value of 10 to 250, having 3% by mass or more of an ethylene structure, and less than 10% by mass of a vinyl aromatic monomer block.

<Iodine Value>

The iodine value of the rubber-like polymer (A) contained in the rubber composition of the present embodiment is 10 to 250.

The iodine value is 10 or more, preferably 15 or more, more preferably 30 or more, further preferably 50 or more, and still further preferably 70 or more from the viewpoint of ease of crosslinking.

On the other hand, from the viewpoint of weather resistance of the rubber-like polymer (A), the iodine value is 250 or less, preferably 200 or less, more preferably 150 or less, further preferably 110 or less, and still further preferably 80 or less.

The iodine value can be measured in accordance with a method described in "JIS K 0070: 1992".

The iodine value is a value, in terms of the weight in grams of iodine, corresponding to an amount of halogen reacting with 100 g of a target substance, and hence the iodine value is expressed in the unit of "g/100 g".

Since a conjugated diene monomer unit has a double bond, for example, if a conjugated diene monomer and a vinyl aromatic monomer are copolymerized in a method for producing the rubber-like polymer (A) described below, the iodine value of the rubber-like polymer (A) is lower when the content of a conjugated monomer unit is lower. Alternatively, if a conjugated diene monomer is hydrogenated in the production method, the iodine value is lower as a hydrogenation rate is higher.

The iodine value of the rubber-like polymer (A) can be controlled to fall in the above-described numerical range by adjusting the amount of a conjugated diene monomer or the like having an unsaturated bond, polymerization conditions such as polymerization time and a polymerization temperature, and conditions employed in hydrogenation process such as a hydrogenation amount and hydrogenation time.

<Ethylene Structure Content>

The rubber-like polymer (A) contained in the rubber composition of the present embodiment has 3% by mass or more of an ethylene structure.

When the ethylene structure content is 3% by mass or more, excellent mechanical strength is obtained. The ethylene structure content is preferably 5% by mass or more, more preferably 30% by mass or more, and further preferably 40% by mass or more.

The ethylene structure content is preferably 90% by mass or less, more preferably 80% by mass or less, and further preferably 70% by mass or less.

When the ethylene structure content is 90% by mass or less, moldability of the rubber composition of the present embodiment into a molded article in the shape of a sheet or a block, and rubber elasticity are excellent.

The ethylene structure in the rubber-like polymer (A) encompasses various aspects such as an ethylene structure obtained by copolymerizing an ethylene monomer, and an ethylene structure obtained by polymerizing a conjugated diene monomer and then hydrogenating the resultant. For example, when a 1,4-butadiene unit is hydrogenated, two ethylene structures are obtained, and when a 1,4-isoprene unit is hydrogenated, one propylene structure and one ethylene structure are obtained.

The ethylene structure content of the rubber-like polymer (A) can be measured by a method described in examples below, and can be controlled to fall in the above-described numerical range by adjusting an amount of ethylene added, an amount of a conjugated diene monomer added, a hydrogenation rate and the like.

<Vinyl Aromatic Monomer Block Content>

The rubber-like polymer (A) has a vinyl aromatic monomer block content of less than 10% by mass (vinyl aromatic monomer block <10% by mass).

The vinyl aromatic monomer block refers to a block including a chain of eight or more aromatic vinyl monomer units.

When the vinyl aromatic monomer block content is less than 10% by mass, moldability of the rubber composition of the present embodiment into a molded bale and cuttability in measuring the molded bale tend to be excellent. The vinyl aromatic monomer block content is preferably 7% by mass or less, more preferably 5% by mass or less, and further preferably 3% by mass or less.

From the viewpoint of flexibility of the rubber-like polymer and the rubber composition, the number of vinyl aromatic monomer blocks each including a chain of 30 or more vinyl aromatic monomer units is preferably small or zero.

The vinyl aromatic monomer block content can be specifically measured, for example, when a polymer contained in the rubber-like polymer (A) is a butadiene-styrene copolymer, by decomposing the polymer by Kolthoff method (method described in I. M. KOLTHOFF, et al., J. Polym. Sci. 1, 429 (1946)) to analyze an amount of polystyrene insoluble in methanol. As another method, a known method, as described in International Publication No. WO2014/133097, such as measurement of a chain of styrene units by NMR can be employed for the measurement.

The vinyl aromatic monomer block content of the rubber-like polymer (A) can be controlled to fall in the above-described numerical range by a method for adding a vinyl aromatic monomer, or by adjusting addition of a polymerization aid, a polymerization temperature and the like.

<Monomer Unit for Causing Unsaturated Group to be Contained in Rubber-Like Polymer (A)>

The rubber-like polymer (A) preferably contains a monomer unit having an unsaturated group, such as a conjugated diene monomer unit or a myrcene, in a content of 2% by mass or more. From the viewpoints of economic efficiency and productivity, it is more preferable to contain a conjugated diene monomer unit.

A conjugated diene monomer unit or a myrcene contained as a component of the rubber-like polymer (A) has a double bond, and hence becomes a crosslinkable unsaturated group.

The content of the monomer unit having an unsaturated group, such as a conjugated diene monomer unit or a myrcene, in the rubber-like polymer (A) is closely related to the iodine value described above.

When the content of the monomer unit having an unsaturated group, such as a conjugated diene monomer unit or a myrcene, in the rubber-like polymer (A) is 2% by mass or more, the rubber-like polymer is excellent in ease of crosslinking.

The content of a conjugated diene monomer unit or the like in the rubber-like polymer (A) is more preferably 3% by mass or more, and further preferably 6% by mass or more.

The content of the monomer unit having an unsaturated group, such as a conjugated diene monomer unit or a myrcene, is preferably 50% by mass or less, more preferably 30% by mass or less, and further preferably 20% by mass or less. In this case, weather resistance and resistance to degradation over time are excellent.

The content of the monomer unit having an unsaturated group, such as a conjugated diene monomer unit or a myrcene, in the rubber-like polymer (A) can be measured by a method described in the Examples below, and can be controlled to fall in the above-described numerical range by adjusting an amount of the monomer having an unsaturated group such as a conjugated diene monomer unit or a myrcene described below, and a hydrogenation rate of the conjugated diene monomer.

(Aluminum (B))

The rubber composition of the present embodiment contains aluminum (B), and the content of the aluminum (B) in the rubber composition is 2 ppm or more and 200 ppm or less.

The content of the aluminum (B) in the rubber composition of the present embodiment is 2 ppm or more from the viewpoint of a cold flow property of a molded bale of the rubber composition. The content is preferably 4 ppm or more, more preferably 6 ppm or more, and further preferably 10 ppm or more.

On the other hand, from the viewpoint of resistance to thermal deterioration of the rubber composition of the present embodiment, the content is 200 ppm or less, preferably 80 ppm or less, more preferably 40 ppm or less, and further preferably 25 ppm or less.

Cold flow can be inhibited when the aluminum (B) is contained probably for the following reason: A compound containing aluminum is dispersed in a micronized form, and during micronization process, is entangled with molecules of the rubber-like polymer (A). The thus formed entangled portions work as physical crosslinking points in the rubber composition, so as to inhibit cold flow.

The content of the aluminum in the rubber composition of the present embodiment can be measured by a method described in the Examples below, and can be controlled to fall in the above-described numerical range by adjusting the type and an amount of a polymerization catalyst or a hydrogenation catalyst added, and conditions of decalcification process or process for removing a solvent described below.

(Suitable Structure of Rubber-Like Polymer (A))

<Hydrogenated Polymer>

The rubber-like polymer (A) is preferably a hydrogenated polymer obtained by hydrogenating some or most of double bonds of conjugated diene monomer units contained in a conjugated diene-based polymer obtained by polymerizing or copolymerizing at least a conjugated diene monomer, and is more preferably a hydrogenated product of a copolymer obtained by copolymerizing at least ethylene and a conjugated diene monomer.

An unsaturated group contained in the rubber-like polymer (A) preferably contains a conjugated diene monomer unit. In other words, in the production process of the rubber-like polymer (A), in hydrogenating some or most of double bonds contained in a polymer after polymerizing or copolymerizing at least a conjugated diene monomer, it is preferable to contain a conjugated diene monomer unit left not hydrogenated for obtaining a desired iodine value among conjugated diene monomer units. Alternatively, when at least ethylene and a conjugated diene monomer are copolymerized, the copolymerization is preferably performed to contain a conjugated diene monomer unit in a polymer to obtain a desired iodine value.

Intermolecular and intramolecular distributions in the rubber-like polymer (A) of the hydrogenation rate, the ethylene, and the monomers such as a conjugated diene monomer and a vinyl aromatic monomer are not especially limited but these may be uniformly present, non-uniformly present, or present with a distribution.

The rubber-like polymer (A) contained in the molded bale of the rubber composition of the present embodiment is preferably a hydrogenated product of a random copolymer from the viewpoints of handleability of the molded bale, and a tensile property, heat resistance and weather resistance obtained in the form of a crosslinked product. Specifically, the molded bale obtained as a hydrogenated product of a random copolymer is excellent from the viewpoint of crushability of a bale as compared with a case where it is obtained as a block copolymer.

<Content of Vinyl Aromatic Monomer Unit>

A content of the vinyl aromatic monomer unit in the rubber-like polymer (A) is preferably 5% by mass or more, more preferably 10% by mass or more, further preferably 15% by mass or more, and still further preferably 20% by mass or more from the viewpoints of resistance to deformation of a molded bale during transport, and break strength and wet skid resistance obtained when the polymer is used in a tire tread.

On the other hand, from the viewpoints of cuttability in measuring the molded bale, making a rubber-like polymer difficult to aggregate in solvent removal process, making a metal content in the rubber composition easily adjusted, and fuel economy and abrasion resistance obtained when the polymer is used in a tire tread, the content of the vinyl aromatic monomer unit in the rubber-like polymer (A) is preferably 45% by mass or less, more preferably 30% by mass or less, and further preferably 25% by mass or less.

Besides, if a high modulus is required as in a run flat tire member or the like, the content is preferably 30% by mass or more.

The content of the vinyl aromatic monomer unit in the rubber-like polymer (A) can be measured by a method described in the Examples below, and can be controlled to fall in the above-described numerical range by adjusting the amount of the vinyl aromatic monomer added in the polymerization process.

(Aluminum (B) in Rubber Composition)

The aluminum (B) contained in the rubber composition of the present embodiment is preferably a residue of a catalyst used in producing the rubber-like polymer (A).

When the rubber-like polymer (A) is a rubber-like polymer obtained by polymerizing a conjugated diene monomer and hydrogenating the resultant, the aluminum (B) is preferably a residue of a hydrogenation catalyst component used in the production, and when the rubber-like polymer (A) is a rubber-like polymer obtained by copolymerizing ethylene and a conjugated diene monomer, the aluminum (B) is preferably a residue of a polymerization catalyst component used in the production.

In the aluminum (B) contained in the rubber composition of the present embodiment, from the viewpoint that it is difficult to be colored and is easy to be dried in production process, preferably 80% by mass or more, more preferably 85% by mass or more, and further preferably 90% by mass or more of the aluminum (B) is aluminum oxide and/or aluminum hydroxide.

As the hydrogenation catalyst component used in the production of the rubber-like polymer (A), from the viewpoint that an amount of metal in the rubber composition can be easily controlled to a desired amount, for example, mixtures or reaction products of a Ti compound and an aluminum compound, such as those described in Japanese Patent Laid-Open Nos. 1-275605, 2-172537, 4-96904, 08-33846, and 08-41081, and International Publication Nos. WO2014/046016, WO2014/046017, WO2014/065283, WO2017/09714, and WO2017/090714, are preferably used.

An example of the Ti compound includes titanocene represented by the following formula (1):

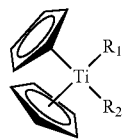

(1)

wherein $R_1$ and $R_2$ represent a group selected from the group consisting of a hydrocarbon group having 1 to 12 carbon atoms, an aryloxy group, an alkoxy group, a halogen group, and a carbonyl group, and $R_1$ and $R_2$ may be the same or different.

From the viewpoint of a high hydrogenation speed, preferable examples of the Ti compound include, but are not limited to, bis(η5-cyclopentadienyl)titanium di(p-tolyl), bis(η5-cyclopentadienyl)titanium di(phenyl), bis(η5-cyclopentadienyl)titanium di(3,4-xylyl), bis(η5-cyclopentadienyl)titanium (furfuryloxy)chloride, and bis(η5-cyclopentadienyl) titanium dichloride.

From the viewpoint of economic efficiency, bis(η5-cyclopentadienyl)titanium dichloride is more preferred.

Preferable examples of the aluminum compound include, but are not limited to, trimethylaluminum, triethylaluminum, triisobutylaluminum, tripentylaluminum, trihexylaluminum, triphenylaluminum, diethylaluminum chloride, dimethylaluminum chloride, ethylaluminum dichloride, methylaluminum sesquichloride, ethylaluminum sesquichloride, diethylaluminum hydride, diisobutylaluminum hydride, triphenylaluminum, tri(2-ethylhexyl)aluminum, (2-ethylhexyl)aluminum dichloride, methylaluminoxane, hydrogenated diisobutylaluminum, and ethylaluminoxane.

From the viewpoint of increasing activity of the hydrogenation catalyst and from the viewpoint of controlling the aluminum content, trimethylaluminum and/or triethylaluminum is preferably used as the aluminum compound. When trimethylaluminum and/or triethylaluminum is selected as the aluminum compound, it is advantageous that efficiency as a promoter for the hydrogenation reaction is high, and that a content ratio of titanium/aluminum in a polymer solution can be easily controlled.

As the polymerization catalyst component used in producing the rubber-like polymer (A), from the viewpoint that a metal content in the rubber composition of the present embodiment can be easily controlled to a desired amount, mixtures of a compound having a lanthanide element and an aluminum compound, such as those described in International Publication Nos. WO2019/078083, WO2019/111496, WO2019/142501, WO2019/171679, and WO2019/216100, are preferred.

Among lanthanide elements, a rare earth element compound such as a gadolinium compound is preferred.

As the gadolinium compound, a rare earth element compound represented by the following formula (2) in which M is gadolinium is preferred.

(2)

In the rare earth element compound represented by the formula (2), M is at least one selected from lanthanide elements, scandium, and yttrium, and $(NQ)^1$, $(NQ)^2$, and $(NQ)^3$ each represent an amide group, and may be the same or different.

It is noted that the formula (2) represents a compound having an M-N bond.

The rare earth element compound represented by the formula (2) contains a compound having three M-N bonds.

Since the compound has three M-N bonds, the respective bonds are chemically equivalent, and hence the structure is stabilized.

In the formula (2), examples of an amide group represented by NQ include, but are not limited to, aliphatic amide groups such as a dimethylamide group, a diethylamide group, and a diisopropylamide group; arylamide groups such as a phenylamide group, a 2,6-di-tert-butylphenylamide group, a 2,6-diisopropylphenylamide group, a 2,6-dineopentylphenylamide group, a 2-tert-butyl-6-isopropylphenylamide group, a 2-tert-butyl-6-neopentylphenylamide group, a 2-isopropyl-6-neopentylphenylamide group, and 2,4,6-tert-butylphenylamide group; and bistrialkylsilylamide groups such as a bistrimethylsilylamide group.

As the rare earth element compound represented by the formula (2), from the viewpoint of a high polymerization speed, tris[bis(trimethylsilyl)amide]gadolinium (Gd[N(Si(CH$_3$)$_3$)$_2$]$_3$) is preferred.

Examples of the aluminum compound contained in the polymerization catalyst component include those described above as the examples of the aluminum compound of the hydrogenation catalyst.

A content of the aluminum compound of the above-described catalyst component and the like to be added in the production of the rubber-like polymer (A) is, in terms of aluminum metal, preferably 300 ppm or less from the viewpoints of resistance to thermal deterioration of the rubber composition of the present embodiment, resistance to oxidative degradation of the molded bale, and economic efficiency. The content is more preferably 200 ppm or less, further preferably 100 ppm or less, and still further preferably 80 ppm or less.

With respect to an amount of the catalyst component added in the production of the rubber-like polymer (A), although a reaction rate is higher as a reaction temperature is higher, when the reaction temperature is increased, the amount to be added needs to be increased in consideration of deactivation of the catalyst component, and hence the amount of metal in the rubber composition is increased. Therefore, in order to reduce the amount of metal in the rubber composition of the present embodiment, the reaction temperature is preferably 100° C. or less, and more preferably 90° C. or less from the viewpoint of reducing the amount of the catalyst component added.

(Metal, Nitrogen Atom and the Like in Rubber Composition)

The rubber composition of the present embodiment preferably contains, as a metal different from aluminum, a metal (C) of group 3 and/or 4 of the periodic table in an amount of 120 ppm or less.

From the viewpoint of mold contamination resistance in molding the rubber composition of the present embodiment, the content is preferably 3 ppm or more, more preferably 10 ppm or more, and further preferably 15 ppm or more.

The mold contamination can be inhibited by the presence of the metal (C) of group 3 and/or 4 of the periodic table probably because close contact of a polymer with the mold is reduced due to the presence of metal particles on a surface in contact with the mold like an effect of a baby powder.

On the other hand, from the viewpoints of difficulty in peeling the rubber composition from the molded bale of the rubber composition and adhesiveness of the molded bale to a packaging sheet, the content is preferably 120 ppm or less, more preferably 100 ppm or less, further preferably 50 ppm or less, and still further preferably 30 ppm or less.

When the upper limit of the content of the metal (C) of group 3 and/or 4 of the periodic table is thus set, the rubber composition can be inhibited from becoming brittle due to the presence of too many metal particles, and the effect of inhibiting peeling of the rubber composition can be obtained.

The metal (C) of group 3 and/or 4 of the periodic table contained in the rubber composition is preferably a residue of the hydrogenation catalyst or the polymerization catalyst used in producing the rubber-like polymer (A). The content of the metal (C) of group 3 and/or 4 of the period table refers to a total amount of metals of groups 3 and 4 of the periodic table, or a total amount of metals of group 3 or metals of group 4 of the periodic table.

Examples of the metal of group 3 of the periodic table include scandium (Sc), yttrium (Y), lanthanides (La to Lu), and actinoids (Ac to Lr).

Examples of the metal of group 4 of the periodic table include titanium, zirconium, hafnium, and rutherfordium. The metal is preferably such a metal used as a component of the hydrogenation catalyst or the polymerization catalyst. In group 3 of the periodic table, lanthanides are more preferred, among which gadolinium is further preferred. In group 4 of the periodic table, titanium is more preferred.

From the viewpoints of production cost of the rubber-like polymer (A), and fuel economy and flexibility obtained when used in a tire, and from the viewpoint of the degree of freedom of a producible structure, the rubber-like polymer (A) is obtained preferably by polymerizing a conjugated diene monomer and then hydrogenating the resultant.

In other words, a metal based on the polymerization catalyst is contained in the polymerization process, and a metal based on the hydrogenation catalyst is contained in the hydrogenation process.

The rubber composition of the present embodiment can contain lithium as a metal different from aluminum.

A content of the lithium in the rubber composition of the present embodiment is preferably 60 ppm or less, more preferably 50 ppm or less, further preferably 40 ppm or less, and still further preferably 30 ppm or less from the viewpoint of discoloration resistance of the rubber composition.

On the other hand, from the viewpoint of tensile elongation obtained by crosslinking, the content is preferably 2 ppm or more, more preferably 5 ppm or more, and further preferably 10 ppm or more.

Conditions employed in process for desolvation from a solution and drying performed after the hydrogenation process affect the content of the aluminum (B) and the content of the lithium. Therefore, it is a preferable aspect to set the conditions employed in the desolvation and/or drying process to make the content of the lithium to fall in a preferable range, and the content of the lithium can be controlled to fall in the above-described numerical range by adjusting the conditions employed in the desolvation and/or drying process.

The content of the metal (C) of group 3 and/or 4 of the periodic table, and the content of the lithium can be controlled by adjusting amounts of a polymerization initiator containing lithium, the hydrogenation catalyst and polymerization catalyst added, and conditions employed in process of removing a solvent from a polymer solution described below.

A reaction temperature is preferably set to be high, because thus, a reaction rate is increased, and hence production efficiency can be easily increased. All of the polymerization initiator, the polymerization catalyst and the hydrogenation catalyst are, however, easily deactivated at a high temperature, and hence, when the reaction temperature is set to be high, there is a tendency that the amounts of the polymerization initiator, the polymerization catalyst and/or the hydrogenation catalyst to be added need to be increased in consideration of their amounts that can be deactivated. In consideration of this, in order to reduce the amount of the lithium contained in the rubber composition of the present embodiment, it is preferable that the reaction temperature is set to be rather low to reduce a deactivation amount and to adjust the amount to be added. Specifically, the reaction temperature is preferably 100° C. or less, and more preferably 90° C. or less.

The contents of the aluminum (B) and the metal (C) of group 3 and/or 4 of the periodic table in the rubber composition of the present embodiment are defined as amounts of the respective elements.

The aluminum (B) and the metal (C) of group 3 and/or 4 of the periodic table corresponding to the residues of the hydrogenation catalyst and the polymerization catalyst are finely dispersed in the rubber composition, or changed to a metal compound or a complex difficult to be specified, and there is a possibility that they may affect physical properties of the rubber composition.

With respect to a size of particles of a metal, a metal compound or a complex contained in the rubber composition of the present embodiment, from the viewpoints of property balance of making a mold difficult to be contaminated, making the rubber composition difficult to be peeled off from the molded bale, and obtaining smoothness when a crosslinking rubber composition is formed into a sheet, the particle size of 60% by volume or more of a total amount, 100% by volume, of the particles is preferably 0.1 to 100 μm, and it is more preferable that the particle size of 80% by volume or more fall in this numerical range.

The particle size of a metal, a metal compound, or a complex contained in the rubber composition can be measured by analyzing, with a laser diffraction type particle size distribution analyzer, a polymer solution obtained by dissolving the rubber composition containing the metal, the metal compound or the complex in an inert solvent.

The rubber-like polymer (A) preferably contains a tin atom or a nitrogen atom from the viewpoints of peeling resistance of the rubber composition from the molded bale of the rubber composition, and fuel economy obtained in the form of a tire. It is more preferable to contain a nitrogen atom.

The rubber-like polymer (A) has a modification ratio, measured by column adsorption GPC of the rubber-like polymer (A), of preferably 40% by mass or more, more preferably 60% by mass or more, and further preferably 70% by mass or more from the viewpoint of dispersibility of silica obtained in producing a tire using silica.

Herein, the term "modification ratio" refers to a mass ratio of a polymer having a nitrogen atom-containing functional group to the total amount of the rubber-like polymer (A).

A position where a nitrogen atom is introduced in the rubber-like polymer (A) may be any one of a polymerization starting end, a molecular chain (including a graft product), and a polymerization end of the rubber-like polymer (A).

When the rubber-like polymer (A) is a hydrogenated product of a conjugated diene-based polymer, from the viewpoints of polymerization productivity, a high modification ratio, and abrasion resistance and fuel economy obtained in the form of a tire, it is preferable to employ a method for introducing a tin atom or a nitrogen atom into the rubber-like polymer (A) with a coupling agent containing a tin atom or a nitrogen atom. It is more preferable to employ a method for introducing a nitrogen atom with a coupling agent containing a nitrogen atom.

As a coupling agent containing a nitrogen atom, from the viewpoints of polymerization productivity and a high modification ratio, an isocyanate compound, an isothiocyanate compound, an isocyanuric acid derivative, a nitrogen group-containing carbonyl compound, a nitrogen group-containing vinyl compound, a nitrogen group-containing epoxy compound, a nitrogen group-containing alkoxysilane compound and the like are preferred.

Among these coupling agents containing a nitrogen atom, from the viewpoints of polymerization productivity of the rubber-like polymer (A), a high modification ratio, and tensile strength obtained in the form of a tire, a nitrogen group-containing alkoxysilane compound is more preferred.

Examples of the nitrogen group-containing alkoxysilane compound include, but are not limited to, 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-1-(4-trimethoxysilylbutyl)-1-aza-2-silacyclohexane, 2,2-dimethoxy-1-(5-trimethoxysilylpentyl)-1-aza-2-silacycloheptane, 2,2-dimethoxy-1-(3-dimethoxymethylsilylpropyl)-1-aza-2-silacyclopentane, 2,2-diethoxy-1-(3-diethoxyethylsilylpropyl)-1-aza-2-silacyclopentane, 2-methoxy-2-methyl-1-(3-trimethoxysilylpropyl)-1-aza-2-silacyclopentane, 2-ethoxy-2-ethyl-1-(3-triethoxysilylpropyl)-1-aza-2-silacyclopentane, 2-methoxy-2-methyl-1-(3-dimethoxymethylsilylpropyl)-1-aza-2-silacyclopentane, 2-ethoxy-2-ethyl-1-(3-diethoxyethylsilylpropyl)-1-aza-2-silacyclopentane, tris(3-trimethoxysilylpropyl)amine, tris(3-methyldimethoxysilylpropyl)amine, tris(3-triethoxysilylpropyl)amine, tris(3-methyldiethoxysilylpropyl)amine, tris(trimethoxysilylmethyl)amine, tris(2-trimethoxysilylethyl)amine, tris(4-trimethoxysilylbutyl)amine, tetrakis[3-(2,2-dimethoxy-1-aza-2-silacyclopentane)propyl]-1,3-propanediamine, tetrakis(3-trimethoxysilylpropyl)-1,3-propanediamine, tetrakis(3-trimethoxysilylpropyl)-1,3-bisaminomethylcyclohexane, and $N^1$-(3-(bis(3-(trimethoxysilyl)propyl)amino)propyl)-$N^1$-methyl-$N^3$-(3-(methyl(3-(trimethoxysilyl)propyl)amino)propyl)-$N^3$-(3-(trimethoxysilyl)propyl)-1,3-propanediamine.

When the rubber-like polymer (A) is produced by copolymerizing ethylene and a conjugated diene monomer, the contents of metals in the rubber composition of the present embodiment are advantageously easily controlled to desired values.

From the viewpoints of fuel economy, abrasion resistance and flexibility obtained when the rubber composition of the present embodiment is used in a tire, the rubber-like polymer (A) preferably contains at least any one of a tin atom, a nitrogen atom, and a silicon atom.

From the viewpoint of productivity of the rubber-like polymer (A), it is preferable to employ a method for introducing, when a conversion rate in the polymerization reaction reaches 100%, at least any one of a tin atom, a nitrogen atom, and a silicon atom with a coupling agent containing a tin atom, a nitrogen atom, or a silicon atom.

Examples of the coupling agent containing a tin atom, a nitrogen atom, or a silicon atom include, but are not limited to, a tin-containing compound such as bis(maleic acid-1-octadecyl)dioctyltin, an isocyanate compound such as 4,4-diphenylmethane diisocyanate, and an alkoxysilane compound such as glycidylpropyltrimethoxysilane.

(Physical Properties of Rubber-Like Polymer (A) and Rubber Composition)

<Glass Transition Temperature>

A glass transition temperature of the rubber-like polymer (A) is preferably −90° C. or more, more preferably −80° C. or more, and further preferably −75° C. or more from the viewpoint of tensile strength obtained in the form of a tire.

On the other hand, from the viewpoints of cut resistance of a sheet obtained in producing a tire and flexibility obtained in the form of a tire, the glass transition temperature is preferably −15° C. or less, more preferably −30° C. or less, and further preferably −40° C. or less.

With respect to the glass transition temperature, a peak top (an inflection point) of a DSC differential curve obtained by recording a DSC curve during temperature increase in a prescribed temperature range in accordance with ISO 22768: 2006 is defined as the glass transition temperature.

<Weight Average Molecular Weight>

A weight average molecular weight of the rubber-like polymer (A) is preferably 150,000 or more, and more preferably 200,000 or more from the viewpoints of shape stability of the molded bale of the rubber composition of the present embodiment, and tensile strength and abrasion resistance of a crosslinked product obtained using the rubber composition.

On the other hand, from the viewpoint of processability obtained in forming the rubber composition as a crosslinking rubber composition, the weight average molecular weight is preferably 1,000,000 or less, more preferably 600,000 or less, and further preferably 500,000 or less.

From the viewpoint of fuel economy obtained when the rubber composition of the present embodiment is used in a tire, a molecular weight distribution (=weight average molecular weight/number average molecular weight) of the rubber-like polymer (A) is preferably 2.0 or less, more preferably 1.8 or less, and further preferably 1.6 or less.

On the other hand, from the viewpoint of processability obtained in forming the rubber composition of the present embodiment as a crosslinking composition, the molecular weight distribution is preferably 1.05 or more, more preferably 1.2 or more, and further preferably 1.4 or more.

The weight average molecular weight and the molecular weight distribution can be calculated based on a molecular weight in terms of polystyrene measured by GPC (gel permeation chromatography), and can be measured by a method described in the Examples below.

<Mooney Viscosity>

Mooney viscosities of the rubber-like polymer (A) and the rubber composition of the present embodiment can be indexes including information of the rubber-like polymer (A), such as the molecular weight, the molecular weight distribution, a branch number, and a content of a softener.

The Mooney viscosity measured at 100° C. of the rubber composition of the present embodiment is preferably 40 or more, more preferably 50 or more, and further preferably 55 or more from the viewpoints of abrasion resistance, steering stability and break strength obtained when the crosslinking rubber composition is used in a tire.

On the other hand, from the viewpoints of productivity of the rubber-like polymer (A) and the rubber composition of the present embodiment, and processability obtained in producing a resin composition with a filler and the like blended, the Mooney viscosity is preferably 170 or less, more preferably 150 or less, further preferably 130 or less, and still further preferably 110 or less.

The Mooney viscosity can be measured by a method prescribed in ISO 289.

(Rubber Softener (D))

The rubber composition of the present embodiment may contain a rubber softener (D) if necessary. A content of the rubber softener (D) in the rubber composition of the present embodiment is preferably 30% by mass or less.

For improving productivity of the rubber-like polymer (A) and processability obtained in blending an inorganic filler and the like in producing a tire, the content of the rubber softener (D) is preferably 1 to 30% by mass.

If the rubber-like polymer (A) has a high molecular weight, for example, if the weight average molecular weight exceeds 1,000,000, the content of the rubber softener (D) is preferably 15 to 30% by mass. On the other hand, if the rubber composition is obtained with a filler blended therein, the content of the rubber softener (D) is preferably 1 to 15% by mass from the viewpoint of increasing the degree of freedom in the amount of the filler to be blended. Thus, an effect of improving processability obtained in preparing a compound can be obtained.

The content of the rubber softener (D) in the rubber composition of the present embodiment is more preferably 20% by mass or less, further preferably 10% by mass or less, and still further preferably 5% by mass or less from the viewpoint of inhibiting degradation over time caused in the form of a tire.

The rubber softener (D) is not especially limited, and examples include an extender oil, a liquid rubber, and a resin.

From the viewpoints of processability, productivity, and economic efficiency, the rubber softener is preferably an extender oil.

As a method for adding the rubber softener to the rubber composition of the present embodiment, although not limited to the following, a method in which the rubber softener (D) is added to be mixed with a polymer solution, and the thus obtained polymer solution containing the rubber softener is desolvated is preferably employed.

Preferable examples of the extender oil include, but are not limited to, an aromatic oil, a naphthenic oil, and a paraffin oil.

Among these, from the viewpoint of environmental safety, and from the viewpoints of oil bleed prevention and wet grip characteristics, an aroma substitute oil containing 3% by mass or less of a polycyclic aromatic (PCA) component in accordance with the IP 346 method is preferred. Examples of the aroma substitute oil include TDAE (Treated Distillate Aromatic Extracts) and MES (Mild Extraction Solvate) described in Kautschuk Gummi Kunststoffe 52 (12) 799 (1999), and RAE (Residual Aromatic Extracts).

[Method for Producing Molded Bale]

A method for producing a molded bale of the present embodiment includes: a step of polymerizing a rubber-like polymer (A) in a solution; a step of obtaining a rubber composition by adding aluminum (B) to the solution containing the rubber-like polymer (A); and a step of molding the rubber composition.

As described above, the aluminum (B) can be contained in the rubber composition by using a catalyst in the polymerization process or a catalyst in the hydrogenation process.

As a method for polymerizing or copolymerizing a conjugated diene monomer and then hydrogenating the resultant, as described in International Publication No. WO96/005250, Japanese Patent Laid-Open No. 2000-053706, and International Publication Nos. WO2003/085010, WO2019/151126, WO2019/151127, WO2002/002663, and WO2015/006179, a method in which a conjugated diene monomer is polymerized by anionic polymerization, or copolymerized with an additional monomer if necessary, with various additives under various conditions, and then hydrogenating the resultant is preferably employed.

Examples of the conjugated diene monomer used in the polymerization process include 1,3-butadiene, isoprene, 2,3-dimethyl-1,3-butadiene, 1,3-pentadiene, 3-methyl-1,3-pentadiene, 1,3-hexadiene, and 1,3-heptadiene. Among these, from the viewpoint of industrial availability, 1,3-butadiene and isoprene are preferred, and 1,3-butadiene is more preferred. One of these may be singly used, or two or more of these may be used together.

As a polymerizable monomer, another monomer different from a conjugated diene monomer and ethylene can be used if necessary.

Another monomer is not especially limited, and a vinyl aromatic monomer is preferred from the viewpoint of mechanical strength obtained in the form of a tire.

Examples of the vinyl aromatic monomer include, but are not limited to, styrene, p-methylstyrene, α-methylstyrene, vinyl ethyl benzene, vinyl xylene, vinyl naphthalene, diphenylethylene, vinyl benzyl dimethylamine, (4-vinylbenzyl) dimethyl aminoethyl ether, N,N-dimethylaminoethyl styrene, N,N-dimethylaminomethyl styrene, and tertiary amino group-containing diphenylethylene (such as 1-(4-N,N-dimethylaminophenyl)-1-phenylethylene). Among these, from the viewpoint of industrial availability, styrene is preferred.

One of these may be singly used, or two or more of these may be used together.

As the polymerizable monomer, an additional monomer may be used if necessary in addition to the conjugated diene monomer and the vinyl aromatic monomer.

Examples of the additional monomer include, but are not limited to, unsaturated carboxylic acid ester, unsaturated carboxylic acid, an α,β-unsaturated nitrile compound, α-olefin (such as butylene, propylene, pentene, or hexene), ethylene, myrcene, ethylidene norbornene, isopropylidene norbornene, cyclopentadiene, and divinylbenzene.

When the rubber-like polymer (A) is a copolymer of ethylene and a conjugated diene monomer, a method for copolymerizing ethylene and a conjugated diene monomer is preferably a method described in, for example, International Publication Nos. WO2019/078083, WO2019/171679, and WO2019/142501. A method in which ethylene, a conjugated diene monomer, and an additional monomer if necessary are copolymerized by coordination polymerization with various additives under various conditions is preferred.

As the conjugated diene monomer, any of the above-described conjugated diene monomers can be used.

The additional monomer is not especially limited, and from the viewpoint of balance among break strength, fuel economy, wet skid resistance, and abrasion resistance obtained in the form of a tire, a vinyl aromatic monomer or a non-conjugated polyene compound monomer is preferably contained.

As the vinyl aromatic monomer, any of the above-described vinyl aromatic monomers can be used.

As the polymerizable monomer, an additional monomer can be used if necessary in addition to the conjugated diene monomer, ethylene and the vinyl aromatic monomer.

As the additional monomer, any of the above-described additional monomers can be used.

When an aluminum compound is added as the polymerization catalyst or the hydrogenation catalyst in producing the rubber-like polymer (A), an amount of the aluminum compound in terms of metal is determined so as to obtain an aluminum content of 2 ppm or more and less than 200 ppm in the rubber-like polymer (A) finally obtained.

From the viewpoints that good polymerizability of the rubber-like polymer (A) is obtained and that the content is easily adjusted in process following the polymerization, the amount of the aluminum compound (in terms of metal) added in producing the rubber-like polymer (A) is preferably 5 ppm or more and less than 300 ppm, more preferably 20 ppm or more and 250 ppm or less, further preferably 35 ppm or more and 220 ppm or less, and still further preferably 45 ppm or more and less than 200 ppm.

When a metal compound of group 3 and/or 4 of the periodic table is added as the polymerization catalyst or the hydrogenation catalyst in producing the rubber-like polymer (A), an amount thereof added (in terms of metal) is determined so as to obtain a preferable content range of the metal (C) of group 3 and/or 4 of the periodic table in the rubber-like polymer (A) finally obtained of preferably 120 ppm or less, and more preferably 3 ppm or more and 120 ppm or less.

From the viewpoints that good polymerizability of the rubber-like polymer (A) is obtained and that the content is easily adjusted in process following the polymerization, the amount (in terms of metal) of the metal compound of group 3 and/or 4 added in producing the rubber-like polymer (A) is preferably 6 ppm or more and 200 ppm or less, more preferably 15 ppm or more and 140 ppm or less, and further preferably 20 ppm or more and 120 ppm or less.

In the production process of the rubber-like polymer (A), when a conjugated diene monomer is polymerized or copolymerized, and then the resultant is hydrogenated, a vinyl bond content in a conjugated diene monomer unit of a conjugated diene-based polymer before hydrogenation is, from the viewpoints of productivity of the rubber-like polymer (A) and high wet skid resistance obtained in the form of a tire, preferably 10% by mol or more, and more preferably 20% by mol or more.

From the viewpoint of mechanical strength obtained when the composition is used in a tire, the vinyl bond content is preferably 75% by mol or less, more preferably 60% by mol or less, further preferably 45% by mol or less, and still further preferably 30% by mol or less.

The vinyl bond content can be measured by a method described in the examples below.

The polymerization process and the hydrogenation process can be performed respectively by either a batch method or a continuous method.

After the polymerization process of the rubber-like polymer (A), or after the hydrogenation process, a deactivating agent, a neutralizer or the like is preferably added to a polymer solution from the viewpoint that the amount of metal in the rubber composition of the present embodiment is adjusted to a desired range.

Examples of the deactivating agent include, but are not limited to, water; and alcohols such as methanol, ethanol, and isopropanol.

Examples of the neutralizer include, but are not limited to, carboxylic acids such as stearic acid, oleic acid, and versatic acid (a carboxylic acid mixture having 9 to 11 carbon atoms, mainly 10 carbon atoms, and having many branches); an aqueous solution of an inorganic acid, and carbon dioxide gas.

After the polymerization process of the rubber-like polymer (A), a rubber stabilizer is preferably added from the viewpoints of prevention of gel formation and processing stability.

Preferable examples of the rubber stabilizer include, but are not limited to, antioxidants such as 2,6-di-tert-butyl-4-hydroxytoluene (hereinafter sometimes referred to as "BHT"), n-octadecyl-3-(4'-hydroxy-3',5'-di-tert-butylphenol)propionate, and 2-methyl-4,6-bis[(octylthio)methyl]phenol.

To the rubber composition of the present embodiment, various additives can be further added if necessary.

As such additives, a filler described below, or a resin component or the like used as a tackifier can be added as a master batch in process performed before molding the molded bale of the rubber composition. In this case, the amount of the additive to be added is preferably 15% by mass or less in the rubber composition.

In the rubber composition of the present embodiment, from the viewpoints of making a used mold difficult to be contaminated, making the rubber composition difficult to be peeled off from the molded bale, and making a packaging sheet easy to adhere to the molded bale, a total content of the rubber-like polymer (A), the aluminum (B), the metal (C) of group 3 and/or 4, and the rubber softener (D) is preferably 85% by mass or more, more preferably 95% by mass or more, and further preferably 97% by mass or more.

In the production process of the rubber composition, the step of polymerizing the rubber-like polymer (A) in a solution is performed, and then, the solvent is removed from the polymer solution.

An example of a method for removing the solvent from the polymer solution includes a method using flushing, steam stripping, a drying conveyer after dehydrogenation, a devolatilizing extruder, a drum dryer, or a devolatilizing kneader.

From the viewpoints that thermal history is small and that the amount of metal in the rubber composition can be easily adjusted to a desired amount, a method using steam stripping is preferred. In particular, a rubber-like polymer (A) obtained by a coupling reaction using a coupling agent containing a nitrogen atom is difficult to adjust the amount of metal therein, and hence, the method using steam stripping is preferred.

Examples of a steam stripping method and a method of a treatment performed before or after include methods described in Japanese Patent Laid-Open Nos. 10-168101 and 10-204136, International Publication No. WO2013/146530, Japanese Patent Laid-Open No. 2019-131810 and the like.

In the method for producing a molded bale of the present embodiment, at a previous stage of performing an extruding/drying step in the production process of the rubber composition contained in the molded bale, a step of desolvating a solvent from the polymer solution by steam stripping, and a screening step of taking out, from a slurry of the polymer, a water-containing crumb by separating from stripping water are preferably performed.

In a previous stage of the steam stripping, a flushing step may be performed for increasing the concentration of the solution.

When the desolvating step of removing the solvent from the polymer solution by steam stripping is performed at a previous stage of the extruding/drying step, a slurry in which porous granular crumbs not containing the solvent but containing water are dispersed in hot water is obtained.

When the screening step of taking out, from the slurry of the polymer, the water-containing crumb by separating from stripping water is performed, a porous granular crumb containing water can be obtained. Besides, a squeezing dehydration step for performing dehydration with a roll, a screw compression squeezer or the like is preferably performed if necessary. Through such a dehydration step, a water-containing crumb in which the water content has been reduced can be obtained at the previous stage of the extruding/drying step.

As a method for obtaining, by steam stripping, a rubber composition in which a requirement of the content of the aluminum (B) in the rubber composition contained in the molded bale of the present embodiment of 2 ppm or more and 200 ppm or less is realized, the lanthanide element content and titanium content are highly adjusted, and a desired amount of a metal residue is contained, conditions employed in causing the solution of the rubber-like polymer (A) after polymerization to be contacted with hot water or steam are preferably adjusted as follows: Specifically, a method in which a pressure for charging the solution of the rubber-like polymer (A) is adjusted, a method in which a pressure, a temperature and an amount of steam are adjusted, a method in which a dispersant such as a phosphoric acid ester or a salt thereof like polyoxyalkylene alkyl ether phosphate, or a surfactant such as nonyl phenoxy polyethylene glycol phosphate or a salt thereof is added to steam, or a method in which the shape or the rotation speed of a rotor used in mixing the solution of the rubber-like polymer (A) after polymerization with hot water or steam is adjusted can be employed.

In the method for producing the rubber composition of the present embodiment, from the viewpoints of economic efficiency and removability of metal, it is preferable to contain an alcohol compound in the polymer solution of the rubber-like polymer (A) as a deactivating agent, and it is more preferable to precedently add, to the rubber-like polymer (A), a dispersant or a surfactant described above that can be added in steam stripping.

As a method to be employed in a case where the content of the aluminum (B) in the rubber composition of the present embodiment is to be reduced, a method in which an alcohol compound is added, as a deactivating agent, to the polymer solution after polymerization in an amount of 0.5 mol times or more, and preferably 1.0 mol times or more of the number of moles of the rubber-like polymer (A), a method in which a volume ratio of steam/rubber-like polymer (A) solution is set to 0.1 or more, and preferably 0.2 or more in steam stripping process, a method in which a processing rate is reduced, or a method in which a surfactant is added to the polymer solution in an amount of 100 ppm or more, and preferably 200 ppm or more with respect to the polymer can be employed.

In the steam stripping process, a linear velocity of the rotor is preferably 5 m/s or more and 20 m/s or less, and more preferably 10 m/s or more and 20 m/s or less.

In the production process of the rubber composition of the present embodiment, when aluminum is added to the rubber-like polymer (A) in an amount in terms of metal of 300 ppm or more, it is preferable that a surfactant is added to the solution of the rubber-like polymer (A) in an amount of 200 ppm or more with respect to the rubber-like polymer (A), and it is preferable that the rotor is rotated at a linear velocity of 15 m/s or more and 20 m/s or less in the steam stripping process.

In the production process of the rubber composition of the present embodiment, when aluminum is added to the rubber-like polymer (A) in an amount in terms of metal of 200 ppm or more and less than 300 ppm, it is preferable that the rotor is rotated at a linear velocity of 10 m/s or more and 20 m/s or less in the steam stripping process.

In the production process of the rubber composition of the present embodiment, when aluminum is added to the rubber-like polymer (A) in an amount in terms of metal less than 200 ppm, it is preferable that the rotor is rotated at a linear velocity of 5 m/s or more and 20 m/s or less in the steam stripping process, and it is preferable that a surfactant is added to the solution of the rubber-like polymer (A) in an amount less than 100 ppm with respect to the rubber-like polymer (A).

After the steam stripping process, as described in, for example, International Publication No. WO2013/146530, a step of subjecting the resultant to drying by extrusion and drying with hot air is preferably performed.

In this manner, a porous granular crumb can be obtained.

A particle size of the crumb is preferably 0.1 mm or more, and more preferably 0.5 mm or more from the viewpoint of obtaining release resistance of the rubber composition from the molded bale, and from the viewpoint of scattering resistance obtained in drying.

On the other hand, the particle size of the crumb is preferably 30 mm or less, and more preferably 20 mm or less from the viewpoints of a drying property of the solvent remaining in the crumb and the water content, and swelling resistance of the molded bale obtained by molding the rubber composition.

The particle size of the crumb may be adjusted during process where the solvent is removed and the crumb is dried, or may be adjusted by processing the produced crumb.

When the particle size is adjusted during process where the solvent is removed and the crumb is dried, for example, a method in which the molecular weight, the composition or the structure of the rubber-like polymer (A) is adjusted, a method in which the amount of the rubber softener (D) to be added to the solution of the rubber-like polymer (A) is adjusted, a method in which a hole size of a die of an extrusion dryer is adjusted, or a method in which conditions for desolvation performed with the solution of the rubber-like polymer (A) put in hot water are adjusted can be employed.

When the particle size is adjusted by processing the produced crumb, for example, a method in which the crumb is sieved, or a method in which the crumb is ground and crushed with a mixer or a granulator can be employed.

A specific surface area of the crumb of the rubber-like polymer (A) obtained in the polymerization step, or the rubber composition of the present embodiment is preferably 0.7 to 3.2 $m^2/g$, and more preferably 1.0 to 3.0 $m^2/g$ from the viewpoint of handleability.

When the specific surface area of the crumb is 0.7 $m^2/g$ or more, an area where one crumb is in close contact with other crumbs present around a molded article, in molding, is increased, and hence the crumb is difficult to peel off from the molded article. When the specific surface area of the crumb is 3.2 $m^2/g$ or less, crumb particles are compressed at a high density to reduce gaps among the crumbs, and hence expansion of the molded bale can be inhibited.

A method for adjusting the specific surface area of the crumb to fall in the above-described range is not especially limited, and for example, a method in which the crumbs are sieved to adjust the composition of each group of sieved crumbs can be employed.

The amount of the solvent remaining in the rubber composition of the present embodiment is preferably smaller from the viewpoints of an odor and VOC reduction. The amount is preferably 5,000 ppm or less, more preferably 3,000 ppm or less, and further preferably 1,500 ppm or less. From the viewpoint of economic efficiency, the amount is preferably 50 ppm or more, more preferably 150 ppm or more, and further preferably 300 ppm or more.

(Water Content of Rubber Composition)

The rubber composition of the present embodiment has a water content of preferably 0.05% by mass or more and 1.5% by mass or less.

The water content of the rubber composition is preferably 0.05% by mass or more, more preferably 0.1% by mass or more, and further preferably 0.2% by mass or more from the viewpoint of inhibiting gelation in drying after solvent removal.

On the other hand, from the viewpoints of preventing condensation and discoloration resistance of the rubber composition, the water content is preferably 1.5% by mass or less, more preferably 1.0% by mass or less, and further preferably 0.8% by mass or less.

The water content of the rubber composition can be controlled to fall in the above-described numerical range by adjusting the particle size of the crumb described above, the shape of the crumb, and the conditions for drying process described above.

The molded bale of the present embodiment is a molded article of the rubber composition of the present embodiment described above, and is a molded article in the shape of a block from the viewpoint of handleability.

The molded bale of the present embodiment is preferably a molded article in the shape of a block of 1,000 $cm^3$ or more. The molded bale is more preferably a rectangular parallelepiped bale of 17.5 kg to 35 kg.

A method for producing a molded bale of the present embodiment includes a step of molding the rubber composition obtained as described above.

As a method for molding the rubber composition, for example, a method in which a crumb of the rubber composition is compressed, or a method in which sheets of the rubber composition are produced and stacked to be compressed can be employed, and in particular, a method in which crumbs having a specific surface area of 0.7 $m^2/g$ to 3.2 $m^2/g$ are produced, and the resultant crumbs are compression molded is preferred. From the viewpoint of moldability, it is preferable to further perform a step of sieving the crumbs before molding.

Since the crumbs are in close contact with one another in the compression molding of the crumbs, a specific surface area of the molded bale is small as compared with the specific surface area of the crumbs. The close contact among the crumbs in the compression molding can be controlled by adjusting the molecular weight, the composition and the structure of the rubber-like polymer (A), the composition of the rubber softener, and a temperature and a pressure employed in the compression. For example, if the specific surface area of the molded bale is to be reduced by increasing the close contact among the crumbs, it is preferable to select a method in which the molecular weight of the rubber-like polymer (A) is reduced, a method in which the amount of the rubber softener is increased, or a method in which the temperature and the pressure in the compression are increased.

The specific surface area of the molded bale of the present embodiment is preferably 0.005 to 0.05 $m^2/g$, and more preferably 0.01 to 0.04 $m^2/g$ from the viewpoint of a film packaging property. The specific surface area of the molded bale is preferably 0.005 $m^2/g$ or more because expansion of the bale can be thus inhibited, and the specific surface area of the molded bale is preferably 0.05 $m^2/g$ or less because the crumbs peeling off from the molded bale can be thus reduced.

The specific surface area of the molded bale can be obtained by a BET method.

In general, the specific surface area of a big molded bale tends to be varied depending on the position, and hence, the specific surface area is preferably measured with a portion near the center of the molded bale collected.

The crumbs of the rubber composition of the present embodiment are preferably sieved into respective particle sizes, before being molded into the molded bale, to be mixed in an appropriate quantitative ratio.

If the specific surface area of the molded bale molded by directly using the crumbs resulting from the desolvation is over the upper limit of the above-described range, it is preferable to increase, among the sieved crumbs, a composition of crumbs having a large particle size and to reduce a composition of crumbs having a small particle size. If the specific surface area of the molded bale is smaller than the lower limit of the above-described range, it is preferable to reduce, among the sieved crumbs, the composition of crumbs having a large particle size and to increase the composition of crumbs having a small particle size.

A compression pressure for molding the molded bale of the present embodiment is preferably 3 to 30 MPa, and more preferably 10 to 20 MPa. When the compression pressure in the molding is 30 MPa or less, an apparatus to be used in the compression can be designed to be compact, and hence installation efficiency is high. When the compression pressure in the molding is 3 MPa or more, good moldability is obtained. When good moldability is obtained, there is a tendency that the surface of the resultant molded bale is smooth, that the rubber-like polymer (A) is not peeled off in process following the molding, and that expansion otherwise caused after the molding is inhibited.

A temperature of the rubber composition in the molding of the bale is preferably 30 to 120° C., and from the viewpoints of reducing a residual solvent and inhibiting thermal deterioration, is more preferably 50 to 100° C.

The temperature of the rubber composition in the molding is preferably 30° C. or more because good moldability is thus obtained, and on the other hand, the temperature is preferably 120° C. or less because gel formation otherwise caused by thermal deterioration of the rubber composition can be thus inhibited.

As the temperature and the pressure in the molding of the bale are higher, the specific surface area of the resultant molded bale is smaller.

A pressure holding time in the molding of the bale is preferably 3 to 30 seconds, and more preferably 5 to 20 seconds. When the pressure holding time in the compression is 30 seconds or less, good production efficiency is obtained, and when it is 5 seconds or more, good moldability is obtained.

In order to avoid molded bales from coming to close contact with one another, the molded bale of the present embodiment is preferably packaged in a resin film (packaging sheet).

Examples of a type of the resin of the film include polyethylene, an ethylene copolymer resin, polystyrene, high impact polystyrene, and PET.

From the viewpoints of handleability of the molded article during transport, and difficulty in occurrence of condensation between the packaging sheet and the molded bale, the packaging sheet preferably has good adhesiveness to the molded bale.

The molded bale of the present embodiment can be used, for example, to be contained in a vessel for transport. An expansion rate of the molded bale obtained 1 day after the molding is preferably less than 5% because the molded bale can be thus satisfactorily held in the vessel.

[Crosslinking Rubber Composition]

From the viewpoint of high mechanical strength and the like, the rubber composition contained in the molded bale of the present embodiment is preferably formed into a crosslinking rubber composition by adding a crosslinking agent thereto to obtain a crosslinked product by crosslinking, which can be used in various applications.

The crosslinking rubber composition of the present embodiment contains at least the rubber composition of the present embodiment described above, and a crosslinking agent, and can further contain, if necessary, an additional rubber component, a filler and the like.

The additional rubber is not especially limited, and can be appropriately selected depending on purposes. Examples include a styrene-butadiene rubber (of emulsion polymerization type or solution polymerization type), a natural rubber, polyisoprene, a butadiene rubber, an acrylonitrile-butadiene rubber (NBR), a chloroprene rubber, an ethylene-propylene rubber (EPM), an ethylene-propylene-non-conjugated diene rubber (EPDM), a butyl rubber, a polysulfide rubber, a silicone rubber, a fluororubber, and a urethane rubber.

One of these may be singly used, or a mixture of two or more of these may be used.

A content of the rubber-like polymer (A) with respect to a total rubber component content corresponding to a total amount of the rubber-like polymer (A) and the additional rubber component in the crosslinking rubber composition of the present embodiment is preferably 20% by mass or more, more preferably 40% by mass or more, further preferably 60% by mass or more, and still further preferably 80% by mass or more from the viewpoint of exhibiting the effects of the present invention.

To the crosslinking rubber composition of the present embodiment, a filler can be added if necessary for purposes of improving a reinforcing property and the like.

A content of the filler in the crosslinking rubber composition of the present embodiment can be appropriately selected depending on purposes, and is preferably 10 to 100 parts by mass, and more preferably 20 to 80 parts by mass with respect to 100 parts by mass of the whole amount of a rubber component corresponding to the total amount of the rubber-like polymer (A) and additional rubber components.

When the content of the filler is 10 parts by mass or more, the effect of improving a reinforcing property resulting from blending the filler can be obtained. When the content is 100 parts by mass or less, a molded sheet can be inhibited from breaking in processing, and the resultant compound can be well gathered with avoiding large deterioration of fuel economy caused in the form of a tire.

Examples of the filler blended in the crosslinking rubber composition of the present embodiment include, but are not limited to, carbon black, silica, aluminum hydroxide, clay, alumina, talc, mica, kaolin, glass balloon, glass bead, calcium carbonate, magnesium carbonate, magnesium hydroxide, magnesium oxide, titanium oxide, potassium titanate, and barium sulfate. Among these, carbon black is preferably used. One of these may be singly used, or two or more of these may be used together.

The carbon black can be appropriately selected depending on purposes, and examples include FEF, GPF, SRF, HAF, N339, IISAF, ISAF, and SAF. One of these may be singly used, or two or more of these may be used together.

A nitrogen adsorption specific surface area ($N_2SA$, measured in accordance with JIS K6217-2: 2001) of the carbon black can be appropriately selected depending on purposes.

When the crosslinking rubber composition of the present embodiment is used as a composition for a fuel efficient tire tread, precipitated silica is suitably used as the filler.

The crosslinking rubber composition of the present embodiment may contain a silane coupling agent from the viewpoints of improvement of dispersibility of the filler and tensile physical strength of the crosslinked product.

The silane coupling agent has a function to make close the interaction between the rubber component and the inorganic filler, and from this point of view, is preferably a compound that has a group having affinity with or a binding property to each of the rubber component and the inorganic filler, and contains, in one molecule, a sulfur bond portion and an alkoxysilyl group or silanol group portion.

Examples of such a compound include, but are not limited to, bis-[3-(triethoxysilyl)-propyl]-tetrasulfide, bis-[3-(triethoxysilyl)-propyl]-disulfide, bis-[2-(triethoxysilyl)-ethyl]-tetrasulfide, S-[3-(triethoxysilyl)-propyl]octanethioate, a condensate of S-[3-(triethoxysilyl)-propyl]octanethioate and [(triethoxysilyl)-propyl]thiol, and a silane carrying at least one thiol (—SH) functional group (referred to as mercaptosilane) and/or at least one masked thiol group.

A content of the silane coupling agent in the crosslinking rubber composition of the present embodiment is preferably 0.1 parts by mass or more and 30 parts by mass or less, more preferably 0.5 parts by mass or more and 20 parts by mass or less, and further preferably 1.0 part by mass or more and 15 parts by mass or less with respect to 100 parts by mass of the filler. When the content of the silane coupling agent falls in this range, there is a tendency that the effect attained by the addition of the silane coupling agent can be made further remarkable.

The crosslinking rubber composition of the present embodiment contains the crosslinking agent. The crosslinking agent can be appropriately selected depending on purposes. Examples include a sulfur-based crosslinking agent, an organic peroxide-based crosslinking agent, an inorganic crosslinking agent, a polyamine crosslinking agent, a resin crosslinking agent, a sulfur compound-based crosslinking agent, and an oxime-nitrosamine-based crosslinking agent.

One of these may be singly used, or two or more of these may be used together.

Aa a rubber composition for a tire, a sulfur-based crosslinking agent (vulcanizing agent) is more preferred among these, and sulfur is further preferred.

A content of the crosslinking agent in the crosslinking rubber composition of the present embodiment is 0.1 parts by mass or more and 20 parts by mass or less with respect to 100 parts by mass of the rubber component. The content of the crosslinking agent is preferably 0.1 parts by mass or more, more preferably 0.5 parts by mass or more, and further preferably 1.5 parts by mass or more with respect to 100 parts by mass of the rubber component from the viewpoints of high tensile strength and a high crosslinking speed. On the other hand, from the viewpoints of inhibiting uneven crosslinking and obtaining high tensile strength, the content is preferably 20 parts by mass or less, more preferably 5 parts by mass or less, and further preferably 3 parts by mass or less.

It is noted that the rubber component contains the rubber-like polymer (A), and the additional rubber component.

In the crosslinking rubber composition of the present embodiment, a vulcanization accelerator may be used in addition to the vulcanizing agent.

Examples of the vulcanization accelerator include guanidine-based, aldehyde-amine-based, aldehyde-ammonia-based, thiazole-based, sulfenamide-based, thiourea-based, thiuram-based, dithiocarbamate-based, and xanthate-based compounds.

In the crosslinking rubber composition of the present embodiment, in addition to the above-described components, various additives such as an additional softener, an additional filler, a heat stabilizer, an antistatic agent, a weathering stabilizer, an anti-aging agent, a colorant, and a lubricant may be blended.

As the additional softener, any of known softeners can be used.

Examples of the additional filler include calcium carbonate, magnesium carbonate, aluminum sulfate, and barium sulfate.

As the heat stabilizer, the antistatic agent, the weathering stabilizer, the anti-aging agent, the colorant, and the lubricant, any of known materials can be respectively used.

(Kneading Method for Crosslinking Rubber Composition)

The crosslinking rubber composition of the present embodiment can be produced by mixing the rubber-like polymer (A), the crosslinking agent, and if necessary, the silica-based inorganic filler, the carbon black and another filler, the silane coupling agent, and various additives such as the rubber softener.

Examples of a mixing method include, but are not limited to, a melt kneading method using a general mixer such as an open roll, a Banbury mixer, a kneader, a single screw extruder, a double screw extruder, or a multi-screw extruder, and a method in which the respective components are dissolved to be mixed, and then a solvent is removed by heating.

Among these, a melt kneading method using a roll, a Banbury mixer, a kneader or an extruder is preferred from the viewpoints of productivity and good kneadability.

Besides, as a mixing method, either of a method in which the rubber component, the filler, the silane coupling agent and the additives are kneaded all at once, and a method in which these are mixed dividedly plural times can be employed.

[Application of Molded Bale and Rubber Composition]

The rubber composition contained in the molded bale of the present embodiment is applicable to, for example, tire members, interiors and exteriors of vehicles, anti-vibration rubbers, belts, shoes, foam materials, and various industrial products.

In particular, the rubber composition and the crosslinking rubber composition are suitably used in tire members.

As the tire members, these compositions can be used in, for example, various tires such as a fuel efficient tire, an all-season tire, a high performance tire, a snow tire, and a studless tire; and various portions of a tire such as a tread, a carcass, a sidewall, and a bead portion. In particular, the rubber composition of the present embodiment is excellent in abrasion resistance, fuel economy, wet skid resistance, and snow performance obtained in the form of a vulcanizate, and in balance among these, and therefore, is suitably used, as the tire member, for a tire tread of a fuel efficient tire, a high performance tire, or a snow tire.

As a method for producing a tire, any of common methods can be employed. For example, members usually used for production of a tire, such as a carcass layer, a belt layer, and a tread layer containing at least one selected from the group consisting of a crosslinking rubber composition before vulcanization and a tire cord, are successively overlayed on a tire forming drum to adhere to one another, and the drum is pulled out to obtain a green tire. Subsequently, the green tire is vulcanized by heating by an ordinary method, and thus, a desired tire (such as a pneumatic tire) can be produced.

EXAMPLES

The present embodiment will now be described in more detail with reference to specific Examples and Comparative Examples, and it is noted that the present embodiment is not limited to the following Examples and Comparative Examples at all.

Various physical properties of the Examples and Comparative Examples were measured by the following methods.

[Physical Properties of Rubber-Like Polymer (A) and Rubber-Like Polymer (A) Before Hydrogenation]

(Weight Average Molecular Weight (Mw) of Rubber-Like Polymer (A) Before Hydrogenation)

A chromatogram was measured with a GPC measuring apparatus including a series of three columns using a polystyrene-based gel as a filler, and a weight average molecular weight (Mw) of a rubber-like polymer before hydrogenation was obtained based on a calibration curve obtained using standard polystyrene.

As an eluent, THE containing 5 mmol/L triethylamine was used.

As columns, a guard column: trade name "TSKguardcolumn Super H-H" manufactured by Tosoh Corporation, and columns: trade names "TSKgel Super H5000", "TSKgel Super H6000", and "TSKgel Super H7000" manufactured by Tosoh Corporation were used.

Under conditions of an oven temperature of 40° C. and a THE flow rate of 0.6 mL/min, an RI detector (trade name "HLC8020" manufactured by Tosoh Corporation) was used. A measurement solution was prepared by dissolving 10 mg of a measurement sample in 20 mL of THF, and 20 µL of the measurement solution was injected into the GPC measuring apparatus for measurement.

(Polymer Mooney Viscosity of Rubber-Like Polymer (A) Before Hydrogenation)

A rubber-like polymer before hydrogenation was used as a sample to measure a Mooney viscosity with a Mooney viscometer (trade name "VR1132" manufactured by Ueshima Seisakusho Co., Ltd.) using an L rotor in accordance with ISO 289.

A measurement temperature was set to 100° C.

First, a sample was preheated for 1 minute at the test temperature, the rotor was rotated at 2 rpm, and torque was measured after 4 minutes to be defined as a Mooney viscosity ($ML_{(1+4)}$).

(Modification Ratio of Rubber-Like Polymer (A))

A modification ratio of a rubber-like polymer (A) was measured by column adsorption GPC as follows. The modification ratio was measured by utilizing a characteristic that a rubber-like polymer modified with a nitrogen atom-containing functional group adsorbs on a column.

A sample solution containing a rubber-like polymer and low molecular weight internal standard polystyrene was measured for an amount of adsorption to a silica-based column based on a difference between a chromatogram measured with a polystyrene-based column and a chromatogram measured with a silica-based column, and thus, a modification ratio was obtained.

Specifically, the measurement was performed as follows.

Preparation of Sample Solution:

A sample solution was prepared by dissolving 10 mg of the rubber-like polymer and 5 mg of standard polystyrene in 20 mL of THF (tetrahydrofuran).

GPC Measurement Conditions using Polystyrene-based Column:

THF containing 5 mmol/L of triethylamine was used as an eluent, and 20 µL of the sample solution was injected into an apparatus for measurement. As columns, a guard column: trade name "TSKguardcolumn Super H-H" manufactured by Tosoh Corporation and columns: trade names "TSKgel Super H5000", "TSKgel Super H6000", and "TSKgel Super H7000" manufactured by Tosoh Corporation were used. Under conditions of an oven temperature of 40° C. and a THF flow rate of 0.6 mL/min, an RI detector (trade name "HLC8020" manufactured by Tosoh Corporation) was used for the measurement to obtain a chromatogram.

GPC Measurement Conditions Using Silica-Based Column:

An apparatus, trade name "HLC-8320GPC" manufactured by Tosoh Corporation was used, THF was used as an eluent, and 50 µL of a sample solution was injected into the apparatus. Under conditions of an oven temperature of 40° C. and a THF flow rate of 0.5 mL/min, an RI detector was used to obtain a chromatogram. As columns, trade names "Zorbax PSM-1000S", "PSM-300S", and "PSM-60S" in series were used, and a column, trade name "DIOL 4.6×12.5 mm 5 micron" was connected as a guard column at a previous stage.

Calculation Method for Modification Ratio:

A modification ratio (%) was obtained in accordance with the following equation assuming that a whole peak area of the chromatogram obtained with the polystyrene-based column is 100, that a peak area of the sample is P1, that a peak area of the standard polystyrene is P2, that a whole peak area of the chromatogram obtained with the silica-based column is 100, that a peak area of the sample is P3, and that a peak area of the standard polystyrene is P4:

$$\text{Modification Ratio (\%)} = [1-(P2 \times P3)/(P1 \times P4)] \times 100$$

wherein P1+P2=P3+P4=100.

(Amount of Bound Styrene in Rubber-Like Polymer (A) Before Hydrogenation)

As a sample, 100 mg of a rubber-like polymer before hydrogenation was dissolved and diluted to 100 mL of chloroform to obtain a measurement sample. An amount of absorption by a phenyl group of styrene at an ultraviolet absorption wavelength (about 254 nm) was used to measure an amount of bound styrene (% by mass) with respect to 100% by mass of the rubber-like polymer before hydrogenation used as the sample.

As a measuring apparatus, a spectrophotometer "UV-2450" manufactured by Shimadzu Corporation was used.

(Microstructure of Butadiene Portion (1,2-Vinyl Bond Content) of Rubber-Like Polymer (A) Before Hydrogenation)

As a sample, 50 mg of a rubber-like polymer before hydrogenation was dissolved in 10 mL of carbon disulfide to obtain a measurement sample.

An infrared spectrum was measured in a range of 600 to 1000 $cm^{-1}$ with a solution cell used, and based on an absorbance at a prescribed wavelength, a microstructure of a butadiene portion, namely, a 1,2-vinyl bond content (% by mol), was obtained in accordance with an equation of Hampton's method (a method described in R. R. Hampton, Analytical Chemistry 21, 923 (1949)).

As a measuring apparatus, a Fourier transform infrared spectrophotometer "FT-IR230" manufactured by JASCO Corporation was used.

(Content of Styrene Block in Rubber-Like Polymer (A))

Assuming that a chain of eight or more styrene structure units is defined as a styrene block, a content of the styrene block was obtained as follows.

Based on a 1H-NMR spectrum at 400 MHz measured with deuterated chloroform used as a solvent, a ratio of an integrated value of the following (a) in each chemical shift range was obtained, and thus, the content of the styrene block contained in the rubber-like polymer was obtained.

(a) Chain of eight or more aromatic vinyl compounds: $6.00 \leq S < 6.68$ (Iodine Value of Rubber-Like Polymer (A))

The iodine value of a rubber-like polymer (A) was calculated in accordance with a method described in "JIS K 0070: 1992".

(Amount of Bound Styrene (after Hydrogenation), Ethylene Structure Content, and Conjugated Diene Monomer Unit Content in Rubber-Like Polymer (A))

A rubber-like polymer was used as a sample to measure, by $^1$H-NMR measurement, an amount of bound styrene (after hydrogenation), an ethylene structure content, and a conjugated diene monomer unit content. Measurement conditions for the $^1$H-NMR measurement were as follows:

<Measurement Conditions>

Apparatus: JNM-LA400 (manufactured by JEOL Ltd.)
Solvent: deuterated chloroform
Measurement sample: rubber-like polymer
Sample concentration: 50 mg/mL
Observation frequency: 400 MHz
Chemical shift reference: TMS (tetramethylsilane)
Pulse delay: 2.904 sec
Number of scans: 64
Pulse width: 450
Measurement temperature: 26° C.

[Physical Properties of Rubber Composition]

(Metal Contents (Al Content and Ti Content) in Rubber Composition)

A rubber composition obtained in each of the examples and comparative examples described below was used as a sample to measure, through elemental analysis using inductivity coupled plasma (ICP, name of apparatus: ICPS-7510, manufactured by Shimadzu Corporation), an aluminum content (Al content, in ppm) and a titanium content (Ti content, in ppm) in the rubber composition.

(Water Content of Rubber Composition)

A water content of a rubber composition was obtained by putting 50 g of the rubber composition in a hot air dryer heated to 150° C. to be dried for 3 hours to measure a mass difference of the rubber composition caused by the drying.

[Evaluation of Molded Bale of Rubber Composition]

(Method for Desolvating Rubber Composition Solution)

<Desolvation Conditions 1>

Assuming steam stripping, a 50 L vessel was charged with 20 L of hot water at 90° C., and under stirring at a rotation speed of 1,000 rpm with a homogenizer (Homo Mixer MARK II (trade name, manufactured by Primix Corporation, 0.2 kW)), a rubber-like polymer solution was added thereto in a dropwise manner for 30 minutes at a rate of 200 g/min. After completing the dropwise addition, the stirring was continued for 30 minutes, and thus, desolvation was performed. A crumb of the rubber composition generated in the hot water was dried to obtain a crumb of the rubber composition.

<Desolvation Conditions 2>

Assuming steam stripping, a 50 L vessel was charged with 20 L of hot water at 90° C., and under stirring at a rotation speed of 6,000 rpm with a homogenizer (Homo Mixer MARK II (trade name, manufactured by Primix Corporation, 0.2 kW)), a rubber-like polymer solution was added thereto in a dropwise manner for 30 minutes at a rate of 200 g/min. After completing the dropwise addition, the stirring was continued for 30 minutes, and thus, desolvation was performed. A crumb of the rubber composition generated in the hot water was dried to obtain a crumb of the rubber composition.

<Desolvation Conditions 3>

Assuming steam stripping, a 50 L vessel was charged with 20 L of hot water at 90° C., and under stirring at a rotation speed of 12,000 rpm with a homogenizer (Homo Mixer MARK II (trade name, manufactured by Primix Corporation, 0.2 kW)), a rubber-like polymer solution was added thereto in a dropwise manner for 30 minutes at a rate of 200 g/min. After completing the dropwise addition, the stirring was continued for 30 minutes, and thus, desolvation was performed. A crumb of the rubber composition generated in the hot water was dried to obtain a crumb of the rubber composition.

(Method for Molding Molded Bale of Rubber Composition)

The crumb prepared as described above was warmed to 60° C., then filled in a rectangular parallelepiped vessel having a length of 210 mm, a width of 105 mm, and a depth of 200 mm, and compressed by applying a pressure of 3.5 MPa with a cylinder over 10 seconds to obtain a molded bale of the rubber composition.

(Evaluation: Cold Flow Property of Molded Article of Rubber Composition)

The molded bale molded under the above-described conditions was used, a load of 5 kg was applied thereto at an ambient temperature of 25° C. and a humidity of 50%, and allowed to stand for 72 hours to measure a thickness (H60), and a ratio (%) of thickness change was calculated in accordance with the following equation:

Ratio (%) of thickness change=$(H0-H60) \times 100 / H0$ wherein H0 indicates a thickness of the bale obtained immediately after molding.

A smaller ratio of thickness change (index) indicates that cold flow of the rubber bale in storage is small and handleability is excellent.

An index less than 10 was evaluated as ⊚, an index of 10 or more and less than 20 was evaluated as ○, an index of 20 or more and less than 40 was evaluated as Δ, and an index of 40 or more was evaluated as X.

For practical use, the index needs to be less than 40, and is preferably less than 20.

(Evaluation: Mold Contamination Resistance)

In molding a molded bale ten times under the above-described conditions, the number of times when the metal or crumb adhered to the rectangular parallelepiped vessel in a total amount of 5 g or more was evaluated.

When the number of times when the metal or crumb adhered in a total amount of 5 g or more was 0 (zero), the contamination resistance was evaluated as ⊚, when the number was one or two, the contamination resistance was evaluated as ○, when the number was three or four, the contamination resistance was evaluated as Δ, and when the number was five or more, the contamination resistance was evaluated as X.

For practical use, the number needs to be four or less, and is preferably two or less.

(Evaluation: Thermal Deterioration)

Thermal deterioration was evaluated by measuring change of an oxidation starting temperature caused by applying a thermal load.

A main body temperature of Lab Plast Mill 30C150 (manufactured by Toyo Seiki Seisaku-sho, Ltd.) was set to 50° C., and 50 g of a rubber composition was put therein to be subjected to 3 cycles of kneading in total, in each cycle of which kneading is performed at 120 rpm for 5 minutes and halted for 5 minutes.

The oxidation starting temperature of the rubber composition was measured before and after the kneading with a thermogravimetry/differential thermal analyzer (STA 7200RV, manufactured by Hitachi).

In air atmosphere, the temperature was increased from 30° C. to 500° C. at 10° C./min, and a temperature at which an endothermic peak was found was defined as the oxidation starting temperature. A difference in the oxidation starting temperature of the rubber composition caused by applying a thermal load was determined as ΔT to be used as an index of thermal deterioration.

As the ΔT is smaller, the rubber composition is better in thermal deterioration, which is preferable because deterioration due to heat of physical properties can be inhibited.

A ΔT of 0° C. or more and less than 5° C. was evaluated as ⊚, a ΔT of 5° C. or more and less than 8° C. was evaluated as ○, a ΔT of 8° C. or more and less than 12° C. was evaluated as Δ, and a ΔT of 12° C. or more was evaluated as X. For a practical use, the ΔT needs to be less than 12° C., and is preferably less than 8° C.

(Evaluation: Peeling Resistance of Rubber Composition from Molded Article)

A molded bale molded under the above-described conditions was used to obtain an amount of a crumb peeled off from the molded bale by a bale drop test.

Specifically, the molded bale was vertically dropped from a height of 100 cm onto a concrete floor, and the amount of the crumb thus peeled off from the molded bale was measured.

The amount of the thus peeled crumb is preferably smaller because the amount of the crumb peeled off from the molded bale in process following the molding in actual production process for the molded bale is thus made also small.

When the amount was less than 0.05% by mass of the whole molded bale, the peeling resistance was evaluated as ⊚, when the amount was 0.05% by mass or more and less than 0.1% by mass, the peeling resistance was evaluated as ○, when the amount was 0.01% by mass or more and less than 0.2% by mass, the peeling resistance was evaluated as Δ, and when the amount was 0.2% by mass or more, the peeling resistance was evaluated as X.

For practical use, the amount needs to be less than 0.2% by mass, and is preferably less than 0.1% by mass.

(Evaluation: Adhesiveness of Packaging Sheet to Molded Article)

A polyethylene film was caused to adhere to an iron plate, and a molded bale was placed on the polyethylene film. After the resultant was allowed to stand at an ambient temperature of 25° C. and a humidity of 50% for 72 hours with a load of 5 kg applied thereto, adhesiveness between the polyethylene film and the molded bale was evaluated.

Specifically, the iron plate was gradually inclined from the state where the molded bale was allowed to stand, and the iron plate was ultimately inclined to an angle of 90 degrees between the iron plate and the ground, and was allowed to stand in this inclined state.

In a case where the molded bale did not drop for 10 seconds or more in the state where the angle between the ground and the iron plate was 90 degrees, the adhesiveness was evaluated as ⊚. In a case where the molded bale dropped in 1 second or more and less than 10 seconds in the state where the angle between the ground and the iron plate was 90 degrees, the adhesiveness was evaluated as ○. In a case where the molded bale dropped when the angle between the ground and the iron plate was 75 degrees or more and less than 90 degrees, or in a case where the molded bale dropped within 1 second after the angle became 90 degrees, the adhesiveness was evaluated as Δ. In a case where the molded bale dropped when the angle between the ground and the iron plate was 0 degree or more and less than 75 degrees, the adhesiveness was evaluated as X.

For practical use, it is necessary that the molded bale does not drop until the angle between the ground and the iron plate becomes 75 degrees or more.

[Preparation of Hydrogenation Catalyst, Rubber-Like Polymer (A), and Rubber Composition]

(Preparation of Hydrogenation Catalyst)

A hydrogenation catalyst used in preparing a rubber-like polymer in each of the Examples and Comparative Examples described below was prepared as follows.

Production Example 1

A nitrogen-substituted reaction vessel was charged with 1 L of dried and purified cyclohexane, and 100 mmol of bis(η5-cyclopentadienyl)titanium dichloride was added thereto. Under sufficient stirring, a n-hexane solution containing 200 mmol of trimethyl aluminum was added thereto to be reacted for about 3 days at room temperature, and thus, a hydrogenation catalyst (TC-1) was obtained.

Production Example 2

A nitrogen-substituted reaction vessel was charged with 1 L of dried and purified cyclohexane, and 100 mmol of bis(η5-cyclopentadienyl)titanium dichloride was added thereto. Under sufficient stirring, a n-hexane solution containing 300 mmol of trimethyl aluminum was added thereto to be reacted for about 3 days at room temperature, and thus, a hydrogenation catalyst (TC-2) was obtained.

Production Example 3

A nitrogen-substituted reaction vessel was charged with 2 L of dried and purified cyclohexane, and 40 mmol of bis(η5-cyclopentadienyl)titanium di-(p-tolyl) and 150 g of 1,2-polybutadiene (1,2-vinyl bond content: about 85%) having a molecular weight of about 1,000 were dissolved therein. Thereafter, a cyclohexane solution containing 60 mmol of n-butyllithium was added to the reaction vessel to cause a reaction at room temperature for 5 minutes, and immediately after this, 40 mmol of n-butanol was added thereto, and the resultant was stirred to obtain a hydrogenation catalyst (TC-3).

The catalysts (TC-1) to (TC-3) thus obtained were stored at room temperature.

(Polymerization of Rubber-Like Polymer (A))

(Polymerization Example 1) Rubber-Like Polymer (S) Before Hydrogenation

A temperature-controllable autoclave having an internal capacity of 40 L and equipped with a stirrer and a jacket was used as a reactor. The reactor was charged with 2,160 g of 1,3-butadiene, 300 g of styrene, and 21,000 g of cyclohexane, from which impurities had been precedently removed, and 30 mmol of tetrahydrofuran (THF) and 4.9 mmol of 2,2-bis(2-oxolanyl)propane used as polar substances, and the internal temperature of the reactor was kept at 42° C.

As a polymerization initiator, 33.2 mmol of n-butyllithium was supplied to the reactor.

After starting a polymerization reaction, the temperature within the reactor started to increase due to heat generation through polymerization, and after monomer conversion within the reactor reached 98%, 540 g of 1,3-butadiene was added to cause a reaction.

The temperature within the reactor finally reached 76° C. Two minutes after reaching this reaction temperature peak, 4.1 mmol of 2,2-dimethoxy-1-(3-trimethoxysilylpropyl)-1-aza-2-silacyclopentane (compound 1) was added to the reactor to perform a coupling reaction for 20 minutes. To the thus obtained polymer solution, 15.0 mmol of methanol used as a reaction terminator was added to obtain a rubber-like polymer solution (SS) before hydrogenation.

A part of the rubber-like polymer solution (SS) before hydrogenation was extracted to be desolvated with a dryer, and thus, a rubber-like polymer (S) before hydrogenation was obtained.

Analysis results are shown in Table 1.

<(Polymerization Example 2) Rubber-Like Polymer (T) Before Hydrogenation>

A temperature-controllable autoclave having an internal capacity of 40 L and equipped with a stirrer and a jacket was used as a reactor. The reactor was charged with 2,100 g of 1,3-butadiene, 780 g of styrene, and 21,000 g of cyclohexane, from which impurities had been precedently removed, and 30 mmol of tetrahydrofuran (THF) and 18.3 mmol of 2,2-bis(2-oxolanyl)propane used as polar substances, and the internal temperature of the reactor was kept at 42° C.

As a polymerization initiator, 26.2 mmol of n-butyllithium was supplied to the reactor.

After starting a polymerization reaction, the temperature within the reactor started to increase due to heat generation through polymerization, and after monomer conversion within the reactor reached 98%, 120 g of 1,3-butadiene was added to cause a reaction.

The temperature within the reactor finally reached 78° C. Two minutes after reaching this reaction temperature peak, 3.3 mmol of N,N'-(1,4-phenylene)bis(4-trimethoxysilyl)butan-1-imine) (compound 2) was added to the reactor to perform a coupling reaction for 20 minutes. To the thus obtained polymer solution, 12.6 mmol of methanol used as a reaction terminator was added to obtain a rubber-like polymer solution (TS) before hydrogenation.

A part of the rubber-like polymer solution (TS) before hydrogenation was extracted to be desolvated with a dryer, and thus, a rubber-like polymer (T) before hydrogenation was obtained.

Analysis results are shown in Table 1.

(Polymerization Example 3) Rubber-Like Polymer (U) Before Hydrogenation

A temperature-controllable autoclave having an internal capacity of 40 L and equipped with a stirrer and a jacket was used as a reactor. The reactor was charged with 450 g of styrene, and 21,000 g of cyclohexane, from which impurities had been precedently removed, and 30 mmol of tetrahydrofuran (THF) and 13.1 mmol of 2,2-bis(2-oxolanyl)propane used as polar substances, and the internal temperature of the reactor was kept at 45° C.

As a polymerization initiator, 26.2 mmol of n-butyllithium was supplied to the reactor.

After starting a polymerization reaction, the temperature within the reactor started to increase due to heat generation through polymerization, and after monomer conversion within the reactor reached 98%, 2,220 g of 1,3-butadiene was added, and 1 minute after completing the addition, 120 g of styrene was added to cause a reaction.

The temperature within the reactor finally reached 78° C. Two minutes after reaching this reaction temperature peak, 3.3 mmol of 2,2-dimethoxy-1-(3-trimethoxysilylpropyl)-1-aza-2-silacyclopentane (compound 1) was added to the reactor to perform a coupling reaction for 20 minutes. To the thus obtained polymer solution, 12.6 mmol of methanol used as a reaction terminator was added to obtain a rubber-like polymer solution (US) before hydrogenation.

A part of the rubber-like polymer solution (US) before hydrogenation was extracted to be desolvated with a dryer, and thus, a rubber-like polymer (U) before hydrogenation was obtained.

Analysis results are shown in Table 1.

(Polymerization Example 4) Rubber-Like Polymer (V) Before Hydrogenation

A temperature-controllable autoclave having an internal capacity of 40 L and equipped with a stirrer and a jacket was used as a reactor. The reactor was charged with 3,000 g of 1,3-butadiene, and 21,000 g of cyclohexane, from which impurities had been precedently removed, and 30 mmol of tetrahydrofuran (THF) and 4.7 mmol of 2,2-bis(2-oxolanyl)propane used as polar substances, and the internal temperature of the reactor was kept at 41° C.

As a polymerization initiator, 36.1 mmol of n-butyllithium was supplied to the reactor.

After starting a polymerization reaction, the temperature within the reactor started to increase due to heat generation through polymerization, and the temperature within the reactor finally reached 80° C. Two minutes after reaching this reaction temperature peak, 4.5 mmol of 2,2-dimethoxy-1-(3-trimethoxysilylpropyl)-1-aza-2-silacyclopentane (compound 1) was added to the reactor to perform a coupling reaction for 20 minutes. To the thus obtained polymer solution, 17.3 mmol of methanol used as a reaction terminator was added to obtain a rubber-like polymer solution (VS) before hydrogenation.

A part of the rubber-like polymer solution (VS) before hydrogenation was extracted to be desolvated with a dryer, and thus, a rubber-like polymer (V) before hydrogenation was obtained.

Analysis results are shown in Table 1.

(Polymerization Example 5) Rubber-Like Polymer (W) Before Hydrogenation

A temperature-controllable autoclave having an internal capacity of 40 L and equipped with a stirrer and a jacket was used as a reactor. The reactor was charged with 2,100 g of 1,3-butadiene, 780 g of styrene, and 21,000 g of cyclohexane, from which impurities had been precedently removed, and 30 mmol of tetrahydrofuran (THF) and 15.1 mmol of 2,2-bis(2-oxolanyl)propane used as polar substances, and the internal temperature of the reactor was kept at 44° C.

As a polymerization initiator, 20.1 mmol of n-butyllithium was supplied to the reactor.

After starting a polymerization reaction, the temperature within the reactor started to increase due to heat generation through polymerization, and after monomer conversion within the reactor reached 98%, 120 g of 1,3-butadiene was added to cause a reaction.

The temperature within the reactor finally reached 79° C. Two minutes after reaching this reaction temperature peak, 1.26 mmol of N,N,N',N'-tetrakis(3-trimethoxysilylpropyl)-1,3-propanediamine (compound 3) was added to the reactor to perform a coupling reaction for 20 minutes. To the thus obtained polymer solution, 10.1 mmol of methanol used as a reaction terminator was added to obtain a rubber-like polymer solution (WS) before hydrogenation.

A part of the rubber-like polymer solution (WS) before hydrogenation was extracted to be desolvated with a dryer, and thus, a rubber-like polymer (W) before hydrogenation was obtained.

Analysis results are shown in Table 1.

<(Polymerization Example 6) Rubber-like Polymer (X) before Hydrogenation>

A temperature-controllable autoclave having an internal capacity of 40 L and equipped with a stirrer and a jacket was used as a reactor. The reactor was charged with 2,160 g of 1,3-butadiene, 300 g of styrene, and 21,000 g of cyclohexane, from which impurities had been precedently removed, and 30 mmol of tetrahydrofuran (THF) and 4.9 mmol of 2,2-bis(2-oxolanyl)propane used as polar substances, and the internal temperature of the reactor was kept at 42° C.

As a polymerization initiator, 33.2 mmol of n-butyllithium was supplied to the reactor.

After starting a polymerization reaction, the temperature within the reactor started to increase due to heat generation through polymerization, and after monomer conversion within the reactor reached 98%, 540 g of 1,3-butadiene was added to cause a reaction.

The temperature within the reactor finally reached 76° C. Two minutes after reaching this reaction temperature peak, 4.1 mmol of silicon tetrachloride (compound 4) was added thereto to perform a coupling reaction for 20 minutes. To the thus obtained polymer solution, 15.0 mmol of methanol used as a reaction terminator was added to obtain a rubber-like polymer solution (XS) before hydrogenation.

A part of the rubber-like polymer solution (XS) before hydrogenation was extracted to be desolvated with a dryer, and thus, a rubber-like polymer (X) before hydrogenation was obtained.

Analysis results are shown in Table 1.

(Preparation of Rubber Composition)

(Example 1) Rubber Composition (SH-1)

To the rubber-like polymer solution (SS) before hydrogenation obtained as described above (Polymerization Example 1), the hydrogenation catalyst (TC-1) prepared as described above (Production Example 1) was added in an amount, in terms of titanium, of 70 ppm (140 ppm in terms of aluminum) per 100 parts by mass of the rubber-like polymer before hydrogenation, followed by a hydrogenation reaction at a hydrogen pressure of 0.8 MPa and an average temperature of 85° C. for 50 minutes, and thus, a rubber-like polymer (S-1) was obtained. The rubber-like polymer thus obtained had an iodine value of 85.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 1>, and the resultant was dried with a dryer to obtain a rubber composition (SH-1).

Analysis results and evaluations of the rubber composition, and evaluations of a molded bale are shown in Table 2.

(Example 2) Rubber Composition (SH-2)

To the rubber-like polymer solution (SS) before hydrogenation obtained as described above (Polymerization Example 1), the hydrogenation catalyst (TC-1) prepared as described above (Production Example 1) was added in an amount, in terms of titanium, of 70 ppm (140 ppm in terms of aluminum) per 100 parts by mass of the rubber-like polymer before hydrogenation, followed by a hydrogenation reaction at a hydrogen pressure of 0.8 MPa and an average temperature of 85° C. for 80 minutes, and thus, a rubber-like polymer (S-2) was obtained. The rubber-like polymer thus obtained had an iodine value of 38.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 1>, and the resultant was dried with a dryer to obtain a rubber composition (SH-2).

Analysis results and evaluations of the rubber composition, and evaluations of a molded bale are shown in Table 2.

(Example 3) Rubber Composition (SH-3)

To the rubber-like polymer solution (SS) before hydrogenation obtained as described above (Polymerization Example 1), the hydrogenation catalyst (TC-2) prepared as described above (Production Example 2) was added in an amount, in terms of titanium, of 80 ppm (240 ppm in terms of aluminum) per 100 parts by mass of the rubber-like polymer before hydrogenation, followed by a hydrogenation reaction at a hydrogen pressure of 0.8 MPa and an average temperature of 85° C. for 50 minutes, and thus, a rubber-like polymer (S-3) was obtained. The rubber-like polymer thus obtained had an iodine value of 85.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 1>, and the resultant was dried with a dryer to obtain a rubber composition (SH-3).

Analysis results and evaluations of the rubber composition, and evaluations of a molded bale are shown in Table 2.

(Example 4) Rubber Composition (SH-4)

To the rubber-like polymer solution (SS) before hydrogenation obtained as described above (Polymerization Example 1), the hydrogenation catalyst (TC-1) prepared as described above (Production Example 1) was added in an amount, in terms of titanium, of 70 ppm (140 ppm in terms of aluminum) per 100 parts by mass of the rubber-like polymer before hydrogenation, followed by a hydrogenation reaction at a hydrogen pressure of 0.8 MPa and an average temperature of 85° C. for 50 minutes, and thus, a rubber-like polymer (S-4) was obtained. The rubber-like polymer thus obtained had an iodine value of 85.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 2>, and the resultant was dried with a dryer to obtain a rubber composition (SH-4).

Analysis results and evaluations of the rubber composition, and evaluations of a molded bale are shown in Table 2.

(Example 5) Rubber Composition (SH-5)

To the rubber-like polymer solution (SS) before hydrogenation obtained as described above (Polymerization Example 1), the hydrogenation catalyst (TC-1) prepared as described above (Production Example 1) was added in an amount, in terms of titanium, of 55 ppm (110 ppm in terms of aluminum) per 100 parts by mass of the rubber-like polymer before hydrogenation, and the hydrogenation catalyst (TC-3) prepared as described above (Production Example 3) was further added in an amount, in terms of titanium, of 55 ppm per 100 parts by mass of the rubber-like polymer before hydrogenation, followed by a hydrogenation reaction at a hydrogen pressure of 0.8 MPa and an average temperature of 95° C. for 40 minutes, and thus, a rubber-like polymer (S-5) was obtained. The rubber-like polymer thus obtained had an iodine value of 85.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 1>, and the resultant was dried with a dryer to obtain a rubber composition (SH-5).

Analysis results and evaluations of the rubber composition, and evaluations of a molded bale are shown in Table 2.

(Example 6) Rubber Composition (SH-6)

To the rubber-like polymer solution (SS) before hydrogenation obtained as described above (Polymerization Example 1), the hydrogenation catalyst (TC-2) prepared as described above (Production Example 2) was added in an amount, in terms of titanium, of 70 ppm (210 ppm in terms of aluminum) per 100 parts by mass of the rubber-like polymer before hydrogenation, followed by a hydrogenation reaction at a hydrogen pressure of 0.8 MPa and an average temperature of 85° C. for 50 minutes, and thus, a rubber-like polymer (S-6) was obtained. The rubber-like polymer thus obtained had an iodine value of 85.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 3>, and the resultant was dried with a dryer to obtain a rubber composition (SH-6).

Analysis results and evaluations of the rubber composition, and evaluations of a molded bale are shown in Table 2.

(Example 7) Rubber Composition (SH-7)

To the rubber-like polymer solution (SS) before hydrogenation obtained as described above (Polymerization Example 1), the hydrogenation catalyst (TC-1) prepared as described above (Production Example 1) was added in an amount, in terms of titanium, of 20 ppm (40 ppm in terms of aluminum) per 100 parts by mass of the rubber-like polymer before hydrogenation, and the hydrogenation catalyst (TC-3) prepared as described above (Production Example 3) was further added in an amount, in terms of titanium, of 20 ppm per 100 parts by mass of the rubber-like polymer before hydrogenation, followed by a hydrogenation reaction at a hydrogen pressure of 0.8 MPa and an average temperature of 75° C. for 120 minutes, and thus, a rubber-like polymer (S-7) was obtained. The rubber-like polymer thus obtained had an iodine value of 85.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 2>, and the resultant was dried with a dryer to obtain a rubber composition (SH-7).

Analysis results and evaluations of the rubber composition, and evaluations of a molded bale are shown in Table 2.

(Example 8) Rubber Composition (TH-1)

To the rubber-like polymer solution (TS) before hydrogenation obtained as described above (Polymerization Example 2), the hydrogenation catalyst (TC-1) prepared as described above (Production Example 1) was added in an amount, in terms of titanium, of 70 ppm (140 ppm in terms of aluminum) per 100 parts by mass of the rubber-like polymer before hydrogenation, followed by a hydrogenation reaction at a hydrogen pressure of 0.8 MPa and an average temperature of 85° C. for 60 minutes, and thus, a rubber-like polymer (T-1) was obtained. The rubber-like polymer thus obtained had an iodine value of 70.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 1>, and the resultant was dried with a dryer to obtain a rubber composition (TH-1).

Analysis results and evaluations of the rubber composition, and evaluations of a molded bale are shown in Table 3.

(Example 9) Rubber Composition (SH-8)

To the rubber-like polymer solution (SS) before hydrogenation obtained as described above (Polymerization Example 1), the hydrogenation catalyst (TC-1) prepared as described above (Production Example 1) was added in an amount, in terms of titanium, of 70 ppm (140 ppm in terms of aluminum) per 100 parts by mass of the rubber-like polymer before hydrogenation, followed by a hydrogenation reaction at a hydrogen pressure of 0.8 MPa and an average temperature of 85° C. for 80 minutes, and thus, a rubber-like polymer (S-8) was obtained. The rubber-like polymer thus obtained had an iodine value of 38.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants, and simultaneously, 150 g of SRAE oil (JOMO Process NC140, manufactured by JX Nippon Oil & Energy Corporation) was added thereto to be mixed. Thereafter, 6,000 g of the resultant rubber composition solution was desolvated by the method described in <Desolvation Conditions 1>, and the resultant was dried with a dryer to obtain a rubber composition (SH-8).

Analysis results and evaluations of the rubber composition, and evaluations of a molded bale are shown in Table 3.

(Example 10) Rubber Composition (SH-9)

To the rubber-like polymer solution (SS) before hydrogenation obtained as described above (Polymerization Example 1), the hydrogenation catalyst (TC-1) prepared as described above (Production Example 1) was added in an amount, in terms of titanium, of 40 ppm (80 ppm in terms of aluminum) per 100 parts by mass of the rubber-like polymer before hydrogenation, followed by a hydrogenation reaction at a hydrogen pressure of 0.95 MPa and an average temperature of 78° C. for 100 minutes, and thus, a rubber-like polymer (S-9) was obtained. The rubber-like polymer thus obtained had an iodine value of 85.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 1>, and the resultant was dried with a dryer to obtain a rubber composition (SH-9).

Analysis results and evaluations of the rubber composition, and evaluations of a molded bale are shown in Table 3.

(Example 11) Rubber Composition (SH-10)

To the rubber-like polymer solution (SS) before hydrogenation obtained as described above (Polymerization Example 1), the hydrogenation catalyst (TC-1) prepared as described above (Production Example 1) was added in an amount, in terms of titanium, of 70 ppm (140 ppm in terms of aluminum) per 100 parts by mass of the rubber-like polymer before hydrogenation, followed by a hydrogenation reaction at a hydrogen pressure of 0.8 MPa and an average temperature of 85° C. for 50 minutes, and thus, a rubber-like polymer (S-10) was obtained. The rubber-like polymer thus obtained had an iodine value of 85.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants, and simultaneously, 6 g of stearic acid was added thereto. Thereafter, 6,000 g of the resultant rubber composition solution was desolvated by the method described in <Desolvation Conditions 1>, and the resultant was dried with a dryer to obtain a rubber composition (SH-10).

Analysis results and evaluations of the rubber composition, and evaluations of a molded bale are shown in Table 3.

(Example 12) Rubber Composition (SH-11)

To the rubber-like polymer solution (SS) before hydrogenation obtained as described above (Polymerization Example 1), the hydrogenation catalyst (TC-1) prepared as described above (Production Example 1) was added in an amount, in terms of titanium, of 70 ppm (140 ppm in terms of aluminum) per 100 parts by mass of the rubber-like polymer before hydrogenation, followed by a hydrogenation reaction at a hydrogen pressure of 0.8 MPa and an average temperature of 85° C. for 50 minutes, and thus, a rubber-like polymer (S-11) was obtained. The rubber-like polymer thus obtained had an iodine value of 85.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 1>, and the resultant was dried with a dryer but was dried merely for a half of the above-described drying time (Example 1) to obtain a rubber composition (SH-11).

Analysis results and evaluations of the rubber composition, and evaluations of a molded bale are shown in Table 3.

(Example 13) Rubber Composition (TH-2)

To the rubber-like polymer solution (TS) before hydrogenation obtained as described above (Polymerization Example 2), the hydrogenation catalyst (TC-1) prepared as described above (Production Example 1) was added in an amount, in terms of titanium, of 70 ppm (140 ppm in terms of aluminum) per 100 parts by mass of the rubber-like polymer before hydrogenation, followed by a hydrogenation reaction at a hydrogen pressure of 0.8 MPa and an average temperature of 85° C. for 40 minutes, and thus, a rubber-like polymer (T-2) was obtained. The rubber-like polymer thus obtained had an iodine value of 129.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 1>, and the resultant was dried with a dryer to obtain a rubber composition (TH-2).

Analysis results and evaluations of the rubber composition, and evaluations of a molded bale are shown in Table 3.

(Example 14) Rubber Composition (WH-1)

To the rubber-like polymer solution (WS) before hydrogenation obtained as described above (Polymerization Example 5), the hydrogenation catalyst (TC-1) prepared as described above (Production Example 1) was added in an amount, in terms of titanium, of 70 ppm (140 ppm in terms of aluminum) per 100 parts by mass of the rubber-like polymer before hydrogenation, and the hydrogenation catalyst (TC-3) prepared as described above (Production Example 3) was further added in an amount, in terms of titanium, of 90 ppm per 100 parts by mass of the rubber-like polymer before hydrogenation, followed by a hydrogenation reaction at a hydrogen pressure of 0.8 MPa and an average temperature of 85° C. for 30 minutes, and thus, a rubber-like polymer (W-1) was obtained. The rubber-like polymer thus obtained had an iodine value of 70.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 1>, and the resultant was dried with a dryer to obtain a rubber composition (WH-1).

Analysis results and evaluations of the rubber composition, and evaluations of a molded bale are shown in Table 3.

(Example 15) Rubber Composition (XH-1)

To the rubber-like polymer solution (XS) before hydrogenation obtained as described above (Polymerization Example 6), the hydrogenation catalyst (TC-1) prepared as described above (Production Example 1) was added in an amount, in terms of titanium, of 70 ppm (140 ppm in terms of aluminum) per 100 parts by mass of the rubber-like polymer before hydrogenation, followed by a hydrogenation reaction at a hydrogen pressure of 0.8 MPa and an average temperature of 85° C. for 50 minutes, and thus, a rubber-like polymer (X-1) was obtained. The rubber-like polymer thus obtained had an iodine value of 85.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 1>, and the resultant was dried with a dryer to obtain a rubber composition (XH-1).

Analysis results and evaluations of the rubber composition, and evaluations of a molded bale are shown in Table 3.

(Comparative Example 1) Rubber Composition (SH-12)

To the rubber-like polymer solution (SS) before hydrogenation obtained as described above (Polymerization Example 1), the hydrogenation catalyst (TC-1) prepared as described above (Production Example 1) was added in an amount, in terms of titanium, of 150 ppm (300 ppm in terms of aluminum) per 100 parts by mass of the rubber-like polymer before hydrogenation, followed by a hydrogenation reaction at a hydrogen pressure of 0.8 MPa and an average temperature of 90° C. for 40 minutes, and thus, a rubber-like polymer (S-12) was obtained. The rubber-like polymer thus obtained had an iodine value of 85.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 1>, and the resultant was dried with a dryer to obtain a rubber composition (SH-12).

Analysis results and evaluations of the rubber composition, and evaluations of a molded bale are shown in Table 4.

(Comparative Example 2) Rubber Composition (SH-13)

To the rubber-like polymer solution (SS) before hydrogenation obtained as described above (Polymerization Example 1), the hydrogenation catalyst (TC-3) prepared as described above (Production Example 3) was added in an amount, in terms of titanium, of 70 ppm per 100 parts by mass of the rubber-like polymer before hydrogenation, followed by a hydrogenation reaction at a hydrogen pressure of 0.8 MPa and an average temperature of 85° C. for 50 minutes, and thus, a rubber-like polymer (S-13) was obtained. The rubber-like polymer thus obtained had an iodine value of 85.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 1>, and the resultant was dried with a dryer to obtain a rubber composition (SH-13).

Analysis results and evaluations of the rubber composition, and evaluations of a molded bale are shown in Table 4.

(Comparative Example 3) Rubber Composition (SH-14)

To the rubber-like polymer solution (SS) before hydrogenation obtained as described above (Polymerization Example 1), the hydrogenation catalyst (TC-1) prepared as described above (Production Example 1) was added in an amount, in terms of titanium, of 5 ppm (10 ppm in terms of aluminum) per 100 parts by mass of the rubber-like polymer before hydrogenation, and the hydrogenation catalyst (TC-3) prepared as described above (Production Example 3) was further added in an amount, in terms of titanium, of 90 ppm per 100 parts by mass of the rubber-like polymer, followed by a hydrogenation reaction at a hydrogen pressure of 0.8 MPa and an average temperature of 80° C. for 40 minutes, and thus, a rubber-like polymer (S-14) was obtained. The rubber-like polymer thus obtained had an iodine value of 85.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 2>, and the resultant was dried with a dryer to obtain a rubber composition (SH-14).

Analysis results and evaluations of the rubber composition, and evaluations of a molded bale are shown in Table 4.

(Comparative Example 4) Rubber Composition (TH-3)

To the rubber-like polymer solution (TS) before hydrogenation obtained as described above (Polymerization Example 2), the hydrogenation catalyst (TC-1) prepared as described above (Production Example 1) was added in an amount, in terms of titanium, of 70 ppm (140 ppm in terms of aluminum) per 100 parts by mass of the rubber-like polymer before hydrogenation, followed by a hydrogenation reaction at a hydrogen pressure of 0.8 MPa and an average temperature of 85° C. for 90 minutes, and thus, a rubber-like polymer (T-3) was obtained. The rubber-like polymer thus obtained had an iodine value of 14.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 1>, and the resultant was dried with a dryer to obtain a rubber composition (TH-3).

Analysis results and evaluations of the rubber composition, and evaluations of a molded bale are shown in Table 4.

(Comparative Example 5) Rubber Composition (UH-1)

To the rubber-like polymer solution (US) before hydrogenation obtained as described above (Polymerization Example 3), the hydrogenation catalyst (TC-1) prepared as described above (Production Example 1) was added in an amount, in terms of titanium, of 70 ppm (140 ppm in terms of aluminum) per 100 parts by mass of the rubber-like polymer before hydrogenation, followed by a hydrogenation reaction at a hydrogen pressure of 0.8 MPa and an average temperature of 85° C. for 60 minutes, and thus, a rubber-like polymer (U-1) was obtained. The rubber-like polymer thus obtained had an iodine value of 70.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 1>, and the resultant was dried with a dryer to obtain a rubber composition (UH-1).

Analysis results and evaluations of the rubber composition, and evaluations of a molded bale are shown in Table 4.

(Comparative Example 6) Rubber Composition (VH-1)

To the rubber-like polymer solution (VS) before hydrogenation obtained as described above (Polymerization Example 4), the hydrogenation catalyst (TC-1) prepared as described above (Production Example 1) was added in an amount, in terms of titanium, of 70 ppm (140 ppm in terms of aluminum) per 100 parts by mass of the rubber-like polymer before hydrogenation, followed by a hydrogenation reaction at a hydrogen pressure of 0.9 MPa and an average temperature of 85° C. for 120 minutes, and thus, a rubber-like polymer (V-1) was obtained. The rubber-like polymer thus obtained had an iodine value of 9.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 1>, and the resultant was dried with a dryer to obtain a rubber composition (VH-1).

Analysis results and evaluations of the rubber composition, and evaluations of a molded bale are shown in Table 4.

TABLE 1

|  |  | Polymerization Example 1 | Polymerization Example 2 | Polymerization Example 3 | Polymerization Example 4 | Polymerization Example 5 | Polymerization Example 6 |
|---|---|---|---|---|---|---|---|
| Rubber-like Polymer (A) before Hydrogenation |  | S | T | U | V | W | X |
| Weight Average Molecular Weight | ten thousand | 30 | 31 | 28 | 31 | 82 | 30 |
| Polymer Mooney Viscosity |  | 47 | 37 | 58 | 32 | 86 | 48 |
| Modifier |  | Compound 1 | Compound 2 | Compound 1 | Compound 1 | Compound 3 | Compound 4 |
| Amount of Bound Styrene | mass % | 10 | 26 | 26 | 0 | 26 | 10 |
| 1,2-Vinyl Bond Content | mol % | 37 | 55 | 40 | 40 | 55 | 40 |

Compounds 1 to 4 shown as modifiers in Table 1 are as follows:
Compound 1: 2,2-dimethoxy-1-(3-trimethoxysilylpropyl)-1-aza-2-silacyclopentane
Compound 2: N,N'-(1,4-phenylene)bis(4-triethoxysilyl)butan-1-imine)
Compound 3: N,N,N',N'-tetrakis(3-trimethoxysilylpropyl)-1,3-propanediamine
Compound 4: silicon tetrachloride

TABLE 2

|  |  | Example 1 | Example 2 | Example 3 | Example 4 | Example 5 | Example 6 | Example 7 |
|---|---|---|---|---|---|---|---|---|
| Rubber-like Polymer (A) before Hydrogenation |  | S | S | S | S | S | S | S |
| Rubber-like Polymer (A) |  | S-1 | S-2 | S-3 | S-4 | S-5 | S-6 | S-7 |
| Hydrogenation Catalyst |  | TC-1 | TC-1 | TC-2 | TC-1 | TC-1 + TC-3 | TC-2 | TC-1 + TC-3 |
| Desolvation Conditions for Rubber Composition Solution |  | 1 | 1 | 1 | 2 | 1 | 3 | 2 |
| Rubber Composition |  | SH-1 | SH-2 | SH-3 | SH-4 | SH-5 | SH-6 | SH-7 |
| Oil | phr | 0 | 0 | 0 | 0 | 0 | 0 | 0 |
| Stearic Acid | phr | 0 | 0 | 0 | 0 | 0 | 0 | 0 |
| Amount of Bound Styrene in Rubber-like Polymer (A) | mass % | 10 | 10 | 10 | 10 | 10 | 10 | 10 |
| Amount of Styrene Block in Rubber-like Polymer (A) | mass % | 1.6 | 2.1 | 1.6 | 1.6 | 1.6 | 1.6 | 1.6 |
| Iodine Value of Rubber-like Polymer (A) | I g/100 g | 85 | 38 | 85 | 85 | 85 | 85 | 85 |
| Ethylene Structure in Rubber-like Polymer (A) | mass % | 40.6 | 49.8 | 40.4 | 40.4 | 40.4 | 40.4 | 40.4 |
| Conjugated Diene Monomer Unit in Rubber-like Polymer (A) | mass % | 17.7 | 7.2 | 18.0 | 18.0 | 18.0 | 18.0 | 18.0 |
| Modification Ratio of Rubber-like Polymer (A) | % | 50.0 | 50.0 | 50.0 | 50.0 | 50.0 | 50.0 | 50.0 |
| Al Content in Rubber Composition | ppm | 80 | 80 | 120 | 27 | 85 | 85 | 5 |
| Ti Content in Rubber Composition | ppm | 50 | 50 | 61 | 42 | 90 | 20 | 30 |
| Water Content in Rubber Composition | mass % | 0.5 | 0.5 | 0.5 | 0.5 | 0.5 | 0.5 | 0.5 |
| Molded Form |  | Bale | Bale | Bale | Bale | Bale | Bale | Bale |
| Cold Flow Property |  | ○ | ◎ | ◎ | Δ | ○ | ○ | Δ |
| Mold Contamination Resistance |  | ○ | ○ | ○ | ○ | ◎ | Δ | Δ |
| Thermal Deterioration (ΔT) |  | ○ | ◎ | Δ | ◎ | ○ | ○ | ◎ |
| Peeling Resistance of Rubber Composition from Molded Article |  | ○ | ◎ | ○ | ○ | Δ | ◎ | ◎ |
| Adhesiveness of Packaging Sheet to Molded Article |  | ○ | Δ | ○ | ○ | Δ | ◎ | ◎ |

TABLE 3

|  |  | Example 8 | Example 9 | Example 10 | Example 11 | Example 12 | Example 13 | Example 14 | Example 15 |
|---|---|---|---|---|---|---|---|---|---|
| Rubber-like Polymer (A) before Hydrogenation |  | T | S | S | S | S | T | W | X |
| Rubber-like Polymer (A) |  | T-1 | S-8 | S-9 | S-10 | S-11 | T-2 | W-1 | X-1 |
| Hydrogenation Catalyst |  | TC-1 | TC-1 | TC-1 | TC-1 | TC-1 | TC-1 | TC-1 + TC-3 | TC-1 |
| Desolvation Conditions for Rubber Composition Solution |  | 1 | 1 | 1 | 1 | 1 | 1 | 1 | 1 |
| Rubber Composition |  | TH-1 | SH-8 | SH-9 | SH-10 | SH-11 | TH-2 | WH-1 | XH-1 |
| Oil | phr | 0 | 5 | 0 | 0 | 0 | 0 | 0 | 0 |
| Stearic Acid | phr | 0 | 0 | 0 | 0.2 | 0 | 0 | 0 | 0 |
| Amount of Bound Styrene in Rubber-like Polymer (A) | mass % | 26 | 10 | 10 | 10 | 10 | 26 | 26 | 10 |

TABLE 3-continued

|  |  | Example 8 | Example 9 | Example 10 | Example 11 | Example 12 | Example 13 | Example 14 | Example 15 |
|---|---|---|---|---|---|---|---|---|---|
| Amount of Styrene Block in Rubber-like Polymer (A) | mass % | 2.1 | 1.6 | 1.6 | 1.6 | 1.6 | 2.1 | 2.3 | 1.5 |
| Iodine Value of Rubber-like Polymer (A) | I g/100 g | 70 | 38 | 85 | 85 | 85 | 129 | 70 | 85 |
| Ethylene Structure in Rubber-like Polymer (A) | mass % | 20.5 | 49.8 | 40.4 | 40.4 | 40.4 | 8.0 | 20.5 | 40.6 |
| Conjugated Diene Monomer Unit in Rubber-like Polymer (A) | mass % | 14.8 | 7.2 | 18.0 | 18.0 | 18.0 | 27.4 | 14.8 | 17.7 |
| Modification Ratio of Rubber-like Polymer (A) | % | 50.0 | 50.0 | 50.0 | 50.0 | 50.0 | 50.0 | 50.0 | 0.0 |
| Al Content in Rubber Composition | ppm | 80 | 76 | 40 | 80 | 80 | 80 | 80 | 80 |
| Ti Content in Rubber Composition | ppm | 50 | 48 | 25 | 50 | 50 | 50 | 140 | 50 |
| Water Content in Rubber Composition | mass % | 0.5 | 0.5 | 0.5 | 0.4 | 1.8 | 0.5 | 0.5 | 0.5 |
| Molded Form |  | Bale | Bale | Bale | Bale | Bale | Bale | Bale | Bale |
| Cold Flow Property |  | ○ | ○ | ○ | ○ | ○ | ○ | ◎ | ○ |
| Mold Contamination Resistance |  | ○ | Δ | Δ | ○ | ○ | ○ | ○ | ○ |
| Thermal Deterioration (ΔT) |  | ○ | ◎ | ◎ | Δ | Δ | ○ | Δ | ○ |
| Peeling Resistance of Rubber Composition from Molded Article |  | ○ | ◎ | ○ | ◎ | ○ | ○ | ○ | Δ |
| Adhesiveness of Packaging Sheet to Molded Article |  | ○ | ○ | ○ | ○ | ○ | ○ | Δ | ○ |

TABLE 4

|  |  | Comparative Example 1 | Comparative Example 2 | Comparative Example 3 | Comparative Example 4 | Comparative Example 5 | Comparative Example 6 |
|---|---|---|---|---|---|---|---|
| Rubber-like Polymer (A) before Hydrogenation |  | S | S | S | T | U | V |
| Rubber-like Polymer (A) |  | S-12 | S-13 | S-14 | T-3 | U-1 | V-1 |
| Hydrogenation Catalyst |  | TC-1 | TC-3 | TC-1 + TC-3 | TC-1 | TC-1 | TC-1 |
| Desolvation Conditions for Rubber Composition Solution |  | 1 | 1 | 2 | 1 | 1 | 1 |
| Rubber Composition |  | SH-12 | SH-13 | SH-14 | TH-3 | UH-1 | VH-1 |
| Oil | phr | 0 | 0 | 0 | 0 | 0 | 0 |
| Stearic Acid | phr | 0 | 0 | 0 | 0 | 0 | 0 |
| Amount of Bound Styrene in Rubber-like Polymer (A) | mass % | 10 | 10 | 10 | 26 | 26 | 0 |
| Amount of Styrene Block in Rubber-like Polymer (A) | mass % | 1.6 | 1.6 | 1.6 | 2.1 | 15 | 0 |
| Iodine Value of Rubber-like Polymer (A) | I g/100 g | 85 | 85 | 85 | 156 | 70 | 9 |
| Ethylene Structure in Rubber-like Polymer (A) | mass % | 40.4 | 40.4 | 40.4 | 2.0 | 31.1 | 60.0 |
| Conjugated Diene Monomer Unit in Rubber-like Polymer (A) | mass % | 18.0 | 18.0 | 18.0 | 33.3 | 14.8 | 2.0 |
| Modification Ratio of Rubber-like Polymer (A) | % | 50.0 | 50.0 | 50.0 | 50.0 | 50.0 | 50.0 |
| Al Content in Rubber Composition | ppm | 230 | 0 | 1 | 80 | 80 | 80 |
| Ti Content in Rubber Composition | ppm | 140 | 60 | 60 | 50 | 50 | 50 |
| Water Content in Rubber Composition | mass % | 0.5 | 0.5 | 0.5 | 0.5 | 0.5 | 0.5 |
| Molded Form |  | Bale | Bale | Bale | Bale | Bale | Bale |
| Cold Flow Property |  | ○ | X | X | Δ | ◎ | ○ |
| Mold Contamination Resistance |  | ○ | ○ | ○ | Δ | Δ | Δ |
| Thermal Deterioration (ΔT) |  | X | ○ | ○ | X | Δ | ○ |
| Peeling Resistance of Rubber Composition from Molded Article |  | X | ○ | ○ | Δ | X | X |
| Adhesiveness of Packaging Sheet to Molded Article |  | X | ○ | ○ | ○ | ○ | X |

[Examples 16 to 18] and [Comparative Examples 7 to 10]

[Preparation of Crosslinking Rubber Composition and Evaluation of Physical Properties]

The rubber compositions (SH-1 to SH-3, SH-12, TH-3, UH-1, and VH-1) of Examples 1 to 3, and Comparative Examples 1, and 4 to 6 shown in Tables 2 to 4 were used as raw material rubber components to obtain crosslinking rubber compositions containing respective raw material rubbers in accordance with the following compositions.

(Rubber Components)
Rubber composition (each of samples SH-1 to SH-3, SH-12, TH-3, UH-1, and VH-1): 80 parts by mass (parts by mass excluding a rubber softener)
High cis polybutadiene (trade name "UBEPOL BR150", manufactured by Ube Industries, Ltd.): 20 parts by mass (Blending Conditions)
The amount of each compounding agent added was expressed in parts by mass with respect to 100 parts by mass of the rubber component excluding a rubber softener.
Silica 1 (trade name "Ultrasil 7000GR" manufactured by Evonik Degussa, nitrogen adsorption specific surface area: 170 m$^2$/g): 50.0 parts by mass
Silica 2 (trade name "Zeosil Premium 200 MP" manufactured by Rhodia, nitrogen adsorption specific surface area: 220 m$^2$/g): 25.0 parts by mass
Carbon black (trade name "Seast KH (N339)" manufactured by Tokai Carbon Co., Ltd.): 5.0 parts by mass
Silane coupling agent (trade name "Si75" manufactured by Evonik Degussa, bis(triethoxysilylpropyl)disulfide): 6.0 parts by mass
SRAE oil (trade name "Process NC140" manufactured by JX Nippon Oil & Energy Corporation): 25.0 parts by mass
Zinc powder: 2.5 parts by mass
Stearic acid: 1.0 part by mass
Anti-aging agent (N-(1,3-dimethylbutyl)-N'-phenyl-p-phenylenediamine): 2.0 parts by mass
Sulfur: 2.2 parts by mass
Vulcanization accelerator 1 (N-cyclohexyl-2-benzothiazylsulfinamide): 1.7 parts by mass
Vulcanization accelerator 2 (diphenylguanidine): 2.0 parts by mass
Total: 222.4 parts by mass (Kneading Method)
The above-described materials were kneaded as follows to obtain a rubber composition.

A closed kneader (having an internal capacity of 0.3 L) equipped with a temperature controller was used to knead, as first stage kneading, the raw material rubber (any one of the samples SH-1 to SH-3, SH-12, TH-3, UH-1, and VH-1), the fillers (silica 1, silica 2, and carbon black), the silane coupling agent, the SRAE oil, zinc powder and stearic acid under conditions of a filling rate of 65% and a rotor speed of 30 to 50 rpm.

Here, the temperature of the closed mixer was controlled to obtain the rubber composition (compound) at a discharge temperature of 155 to 160° C.

Next, as second stage kneading, after the compound obtained as described above was cooled to room temperature, the anti-aging agent was added thereto, and the resultant was kneaded again for improving dispersibility of the silica. Also in this case, the discharge temperature of the compound was adjusted to 155 to 160° C. by the temperature control of the mixer.

After cooling, as third stage kneading, the resultant was kneaded with sulfur and the vulcanization accelerators 1 and 2 added thereto with an open roll set to 70° C. Thereafter, the resultant was molded, and vulcanized with a vulcanization press at 160° C. for 20 minutes.

The rubber composition after the vulcanization was evaluated. Specifically, the evaluations were performed by the following methods.

Results are shown in Table 5.

(Evaluations 1 and 2) Wet Skid Resistance and Fuel Economy (Viscosity Parameter)
A viscosity tester "ARES" manufactured by Rheometric Scientific was used to measure a viscosity parameter in a twist mode.

A tan δ measured at 0° C., a frequency of 10 Hz, and a strain of 1% was used as an index of wet skid resistance. A larger index indicates better wet skid resistance.

A tan δ measured at 50° C., a frequency of 10 Hz, and a strain of 3% was used as an index of fuel economy. A smaller index indicates better fuel economy.

Table 5 shows, with the physical properties of the compound of Comparative Example 7 used as references, signs corresponding to changes of the respective performances in the following ranges.

Δ: from deterioration by less than 5% to improvement by less than 5%
◯: from improvement by 5% or more to improvement by less than 15%
◉: from improvement by 15% or more to improvement by less than 20%
X: deterioration by 5% or more (Evaluation 3) Fracture Property
Breaking strength and elongation at break were measured in accordance with a tensile test method of JIS K6251. A product of measured values of the breaking strength and the elongation at break was defined as a fracture property.

Table 5 shows, with the physical property of the compound of Comparative Example 7 used as a reference, signs corresponding to changes of the respective performances in the following ranges.

Δ: from deterioration by less than 5% to improvement by less than 5%
◯: from improvement by 5% or more to improvement by less than 15%
◉: from improvement by 15% or more to improvement by less than 20%
X: deterioration by 5% or more

TABLE 5

|  | Example 16 Compound Example 1 | Example 17 Compound Example 2 | Example 18 Compound Example 3 | Comparative Example 7 Compound Example 4 | Comparative Example 8 Compound Example 5 | Comparative Example 9 Compound Example 6 | Comparative Example 10 Compound Example 7 |
|---|---|---|---|---|---|---|---|
| Rubber Composition | SH-1 | SH-2 | SH-3 | SH-12 | TH-3 | UH-1 | VH-1 |
| Wet Skid Resistance INDEX | 100 | Δ | ◯ | Δ | Δ | Δ | X |

TABLE 5-continued

|  |  | Example 16 Compound Example 1 | Example 17 Compound Example 2 | Example 18 Compound Example 3 | Comparative Example 7 Compound Example 4 | Comparative Example 8 Compound Example 5 | Comparative Example 9 Compound Example 6 | Comparative Example 10 Compound Example 7 |
|---|---|---|---|---|---|---|---|---|
| Fuel Economy | INDEX | 100 | Δ | Δ | Δ | X | X | ○ |
| Fracture Property | INDEX | 100 | Δ | ⊚ | Δ | X | ○ | X |

As shown in Tables 2 to 4, it was confirmed that the molded bales of the rubber compositions of Examples 1 to 15 are excellent, as compared with those of the comparative examples, in balance among a cold flow property, mold contamination resistance, resistance to thermal deterioration, peeling resistance of the rubber composition from the molded article, and adhesiveness of a packaging sheet to the molded article.

Since the molded bale is difficult to cold flow, it is difficult to be deformed over time, and hence handleability of the molded bale is improved. Since the molded bale is difficult to be thermally deteriorated, it is not thermally deteriorated during production or a period from the production to use, and in addition, is little deteriorated in preparation (kneading) of a crosslinking rubber composition or the like, and good physical properties are obtained after processing. Since a used mold is difficult to be contaminated, contamination is less caused by substances adhering to the mold during molding of a bale, and excellent production stability obtained. Since the rubber composition is difficult to be peeled off from the molded bale, the rubber composition is little peeled off after molding the bale, and hence excellent bale moldability and production stability are obtained. Since a packaging sheet easily adheres to the molded bale, a gap between the packaging sheet and the bale is so small that condensation is difficult to occur, and the bale is excellent also in handleability in transport.

Besides, as shown in Table 5, it was also confirmed that the crosslinking rubber compositions of Examples 16 to 18 are equivalent or better in balance of the physical properties as compared with the crosslinking rubber composition of Comparative Example 7, and that the crosslinking rubber compositions of the Comparative Examples 8 to 10 are inferior in the balance of the physical properties.

The rubber composition contained in the molded bale of the present invention is suitable as a constituent material of a crosslinking rubber composition, and specifically, is industrially applicable in the fields of tire members, interiors and exteriors of vehicles, anti-vibration rubbers, belts, shoes, foam materials, various industrial products, and the like.

What is claimed is:

1. A molded bale of a rubber composition, comprising:
   a polymer (A) having an iodine value of 10 to 250, 3% by mass or more of an ethylene structure, and less than 10% by mass of a vinyl aromatic monomer block; and
   aluminum (B),
   wherein a content of the aluminum (B) is 2 ppm or more and 200 ppm or less, and
   the polymer (A) is a hydrogenated polymer obtained by hydrogenating some or most of double bonds of conjugated diene monomer units contained in a conjugated diene-based polymer obtained by polymerizing or copolymerizing at least a conjugated diene monomer.

2. The molded bale according to claim 1, wherein the polymer (A) is at least one selected from the group consisting of a hydrogenated product of a conjugated diene-based polymer, and a hydrogenated product of a copolymer of ethylene and a conjugated diene monomer.

3. The molded bale according to claim 1, wherein the rubber composition further comprises a metal (C) of group 3 and/or 4 of the periodic table in an amount of 3 ppm or more to 120 ppm or less.

4. The molded bale according to claim 1, wherein the polymer (A) contains 5% by mass or more of a the vinyl aromatic monomer unit.

5. The molded bale according to claim 1, wherein the polymer (A) contains a nitrogen atom.

6. The molded bale according to claim 1, wherein the polymer (A) has a modification ratio measured by column adsorption GPC of 40% by mass or more.

7. The molded bale according to claim 1, wherein the rubber composition further comprises 1% by mass or more to 30% by mass or less of a rubber softener (D).

8. The molded bale according to claim 1, wherein the rubber composition has 0.05% by mass or more and 1.5% by mass or less of water.

9. The molded bale according to claim 1, wherein the rubber composition comprises 2 ppm or more and 60 ppm or less of lithium.

10. The molded bale according to claim 1, wherein 90% by mass or more of the content of the aluminum (B) is aluminum oxide and/or aluminum hydroxide.

11. A crosslinking rubber composition, comprising:
    the rubber composition of the molded bale according to claim 1; and
    a crosslinking agent,
    wherein the crosslinking agent is contained in an amount of 0.1 parts by mass or more and 20 parts by mass or less with respect to 100 parts by mass of a rubber component.

12. A tread for a tire, comprising the rubber composition of the molded bale according to claim 1.

* * * * *